United States Patent
Venkatachalam et al.

(10) Patent No.: US 8,389,160 B2
(45) Date of Patent: Mar. 5, 2013

(54) POSITIVE ELECTRODE MATERIALS FOR LITHIUM ION BATTERIES HAVING A HIGH SPECIFIC DISCHARGE CAPACITY AND PROCESSES FOR THE SYNTHESIS OF THESE MATERIALS

(75) Inventors: Subramanian Venkatachalam, Fremont, CA (US); Herman Lopez, Sunnyvale, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 1003 days.

(21) Appl. No.: 12/246,814

(22) Filed: Oct. 7, 2008

(65) Prior Publication Data

US 2010/0086853 A1  Apr. 8, 2010

(51) Int. Cl.
*H01M 4/131* (2010.01)
*H01M 4/1315* (2010.01)
*H01M 4/1391* (2010.01)
*H01M 4/13915* (2010.01)
*H01M 4/48* (2010.01)
*H01M 4/505* (2010.01)
*H01M 4/525* (2010.01)

(52) U.S. Cl. ............ 429/231.95; 429/231.1; 429/231.3; 423/594.4; 423/594.6

(58) Field of Classification Search ............... 429/218.1, 429/224, 231.1, 231.3, 231.9–231.95
See application file for complete search history.

(56) References Cited

U.S. PATENT DOCUMENTS

| | | |
|---|---|---|
| 4,957,543 A | 9/1990 | Babjak et al. |
| 5,374,491 A | 12/1994 | Brannan et al. |
| 5,658,693 A | 8/1997 | Thackeray et al. |
| 5,674,645 A | 10/1997 | Amatucci et al. |
| 5,738,907 A | 4/1998 | Vaccaro et al. |

(Continued)

FOREIGN PATENT DOCUMENTS

| | | |
|---|---|---|
| EP | 2264814 A1 | 12/2010 |
| JP | 57065674 A2 | 4/1982 |

(Continued)

OTHER PUBLICATIONS

Thackeray et al., "LiMnO3-stabilized LiMO2 (M=Mn, Ni, Co) electrodes for lithium-ion batteries." J. Mater. Chem., 2007; 17:3112-3125.*

(Continued)

*Primary Examiner* — Jonathan Crepeau
*Assistant Examiner* — Jacob Buchanan
(74) *Attorney, Agent, or Firm* — Dardi & Herbert, PLLC; Peter S. Dardi; Mengmeng Fahrni

(57) ABSTRACT

Positive electrode active materials are described that have a very high specific discharge capacity upon cycling at room temperature and at a moderate discharge rate. Some materials of interest have the formula $Li_{1+x}Ni_{\alpha}Mn_{\beta}Co_{\gamma}O_2$, where x ranges from about 0.05 to about 0.25, α ranges from about 0.1 to about 0.4, β ranges from about 0.4 to about 0.65, and γ ranges from about 0.05 to about 0.3. The materials can be coated with a metal fluoride to improve the performance of the materials especially upon cycling. Also, the coated materials can exhibit a very significant decrease in the irreversible capacity lose upon the first charge and discharge of the cell. Methods for producing these materials include, for example, a co-precipitation approach involving metal hydroxides and sol-gel approaches.

18 Claims, 17 Drawing Sheets

U.S. PATENT DOCUMENTS

| | | | |
|---|---|---|---|
| 6,037,095 | A | 3/2000 | Miyasaka |
| 6,087,042 | A | 7/2000 | Sugiyama et al. |
| 6,168,887 | B1 | 1/2001 | Dahn et al. |
| 6,183,718 | B1 | 2/2001 | Barker et al. |
| 6,248,477 | B1 | 6/2001 | Howard, Jr. et al. |
| 6,251,822 | B1 | 6/2001 | Peng et al. |
| 6,322,744 | B1 | 11/2001 | Kelley et al. |
| 6,337,156 | B1 | 1/2002 | Narang et al. |
| 6,372,385 | B1 | 4/2002 | Kweon et al. |
| 6,383,687 | B1 | 5/2002 | Gibbons et al. |
| 6,420,071 | B1 | 7/2002 | Lee et al. |
| 6,428,766 | B1 | 8/2002 | Fujino et al. |
| 6,489,060 | B1 | 12/2002 | Zhang et al. |
| 6,528,208 | B1 | 3/2003 | Thackeray et al. |
| 6,589,499 | B2 | 7/2003 | Gao et al. |
| 6,596,435 | B2 | 7/2003 | Kelley et al. |
| 6,660,432 | B2 | 12/2003 | Paulsen et al. |
| 6,677,082 | B2 | 1/2004 | Thackeray et al. |
| 6,680,143 | B2 | 1/2004 | Thackeray et al. |
| 6,682,849 | B2 | 1/2004 | Narang et al. |
| 6,730,429 | B2 | 5/2004 | Thackeray et al. |
| 6,749,648 | B1 | 6/2004 | Kumar et al. |
| 6,855,460 | B2 | 2/2005 | Vaughey et al. |
| 6,872,491 | B2 | 3/2005 | Kanai et al. |
| 6,964,828 | B2 | 11/2005 | Lu et al. |
| 7,078,128 | B2 | 7/2006 | Lu et al. |
| 7,135,252 | B2 | 11/2006 | Thackeray et al. |
| 7,166,385 | B2 | 1/2007 | Ishida et al. |
| 7,201,994 | B2 | 4/2007 | Watanabe et al. |
| 7,201,997 | B2 | 4/2007 | Ishida et al. |
| 7,205,072 | B2 | 4/2007 | Kang et al. |
| 7,229,717 | B2 | 6/2007 | Yamaguchi et al. |
| 7,252,907 | B2 | 8/2007 | Takeuchi et al. |
| 7,285,357 | B2 | 10/2007 | Jordy et al. |
| 7,364,793 | B2 | 4/2008 | Paulsen et al. |
| 7,368,071 | B2 | 5/2008 | Dahn et al. |
| 7,393,476 | B2 | 7/2008 | Shiozaki et al. |
| 7,416,813 | B2 | 8/2008 | Fujihara et al. |
| 7,435,402 | B2 | 10/2008 | Kang et al. |
| 7,452,631 | B2 | 11/2008 | Kitao et al. |
| 7,468,223 | B2 | 12/2008 | Thackeray et al. |
| 7,517,613 | B2 | 4/2009 | Yuasa et al. |
| 7,674,557 | B2 | 3/2010 | Sun et al. |
| 7,927,506 | B2 | 4/2011 | Park |
| 7,935,270 | B2 | 5/2011 | Park |
| 2002/0055042 | A1 | 5/2002 | Kweon et al. |
| 2002/0114995 | A1 | 8/2002 | Thackeray et al. |
| 2003/0082448 | A1 | 5/2003 | Cho et al. |
| 2003/0087155 | A1 | 5/2003 | Cho et al. |
| 2003/0108790 | A1 | 6/2003 | Manthiram et al. |
| 2004/0076884 | A1 | 4/2004 | Lee et al. |
| 2004/0091779 | A1* | 5/2004 | Kang et al. ............ 429/231.1 |
| 2005/0031942 | A1 | 2/2005 | Hennige et al. |
| 2005/0202316 | A1 | 9/2005 | Hwang et al. |
| 2006/0051671 | A1 | 3/2006 | Thackeray et al. |
| 2006/0051673 | A1 | 3/2006 | Johnson et al. |
| 2006/0083991 | A1 | 4/2006 | Ahn et al. |
| 2006/0147809 | A1 | 7/2006 | Amine et al. |
| 2006/0188781 | A1 | 8/2006 | Thackeray et al. |
| 2006/0257743 | A1 | 11/2006 | Kuratomi et al. |
| 2006/0275667 | A1 | 12/2006 | Watanabe et al. |
| 2007/0072080 | A1 | 3/2007 | Inagaki et al. |
| 2007/0111098 | A1 | 5/2007 | Yang Kook et al. |
| 2007/0148544 | A1 | 6/2007 | Le |
| 2007/0202405 | A1 | 8/2007 | Shizuka et al. |
| 2007/0292757 | A1 | 12/2007 | Watanabe et al. |
| 2008/0102369 | A1 | 5/2008 | Sakata et al. |
| 2008/0107968 | A1 | 5/2008 | Patoux et al. |
| 2008/0118847 | A1 | 5/2008 | Jung et al. |
| 2008/0135802 | A1 | 6/2008 | Saito et al. |
| 2008/0157027 | A1 | 7/2008 | Manthiram et al. |
| 2008/0193841 | A1 | 8/2008 | Sun et al. |
| 2008/0241693 | A1 | 10/2008 | Fukuchi et al. |
| 2008/0268347 | A1 | 10/2008 | Ohzuku et al. |
| 2009/0087362 | A1 | 4/2009 | Sun et al. |
| 2009/0155694 | A1 | 6/2009 | Park |
| 2009/0263707 | A1 | 10/2009 | Buckley et al. |
| 2009/0297947 | A1 | 12/2009 | Deng et al. |
| 2009/0305131 | A1 | 12/2009 | Kumar et al. |
| 2010/0086854 | A1 | 4/2010 | Kumar et al. |
| 2010/0119942 | A1 | 5/2010 | Kumar |
| 2010/0151332 | A1 | 6/2010 | Lopez et al. |
| 2011/0017528 | A1 | 1/2011 | Kumar et al. |
| 2011/0052981 | A1 | 3/2011 | Lopez et al. |
| 2011/0052989 | A1 | 3/2011 | Venkatachalam et al. |
| 2011/0076556 | A1 | 3/2011 | Karthikeyan et al. |
| 2011/0111294 | A1 | 5/2011 | Lopez et al. |
| 2011/0111298 | A1 | 5/2011 | Lopez et al. |
| 2011/0136019 | A1 | 6/2011 | Amiruddin et al. |
| 2011/0236751 | A1 | 9/2011 | Amiruddin et al. |
| 2011/0244331 | A1 | 10/2011 | Karthikeyan et al. |
| 2012/0028105 | A1 | 2/2012 | Kumar et al. |
| 2012/0056590 | A1 | 3/2012 | Amiruddin et al. |
| 2012/0070725 | A1 | 3/2012 | Venkatachalam et al. |

FOREIGN PATENT DOCUMENTS

| | | |
|---|---|---|
| JP | 06-243871 | 9/1994 |
| JP | 09-045373 | 2/1997 |
| JP | 10-255837 | 9/1998 |
| JP | 3112138 | 9/2000 |
| JP | 2002-110167 | 4/2002 |
| JP | 3506397 | 12/2003 |
| JP | 2006-134816 | 5/2006 |
| JP | 2006-344425 A | 12/2006 |
| JP | 2007-220630 A | 8/2007 |
| JP | 3276451 | 2/2008 |
| JP | 2008-536285 A | 9/2008 |
| JP | 2008-258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 A | 1/2008 |
| KR | 10-0822013 | 4/2008 |
| KR | 10-2008-0099132 A | 11/2008 |
| KR | 10-2009-0078128 A | 7/2009 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2006/025707 A1 | 3/2006 |
| WO | 2006109930 A1 | 10/2006 |
| WO | WO 2006109930 A1 * | 10/2006 |
| WO | 2006/137673 A1 | 12/2006 |
| WO | 2008/086041 A1 | 7/2008 |

OTHER PUBLICATIONS

Boulineau et al., "Reinvestigation of Li2MnO3 Structure: Electron Diffraction and High Resolution TEM," Chem. Mater. 2009, 21, 4216-4222.

Hong et al., "Structural evolution of layered Li1.2Ni0.2Mn0.6O2 upon electrochemical cycling in a Li rechargeable battery," J. Mater. Chem., 2010, 20, 10179-10186.

Johnson et al., "Lithium-manganese oxide electrodes with layered-spinel composite structures xLi2MnO3·(1−x)Li1+yMn2−yO4 (0<x<1, 0≦y≦0.33) for lithium batteries," Electrochemistry Communications 7 (2005) 528-536.

Park et al., "Physical and electrochemical properties of spherical Li1+x(Ni⅓Co⅓Mn⅓)1−xO2 cathode materials," Journal of Power Sources 177 (2008) 177-183.

Robertson et al., "Mechanism of Electrochemical Activity in Li2MnO3," Chem. Mater. 2003, 15, 1984-1992.

Yabuuchi et al., "Detailed Studies of a High-Capacity Electrode Material for Rechargeable Batteries, Li2MnO3–LiCo⅓Ni⅓Mn⅓O2," J. Am. Chem. Soc. 2011, 133, 4404-4419.

Fey et al., "Saturated linear dicarboxylic acids as chelating agents for the sol-gel synthesis of LiNi0.8Co0.2O2," Materials Chemistry and Physics, 87 (2004) 246-255.

Lee et al., "High capacity Li[Li0.2Ni0.2Mn0.6]O2 cathode materials via a carbonate co-precipitation method," J. of Power Sources, 162 (2006), 1346-1350.

Sun et al., "AlF3-Coating to Improve High Voltage Cycling Performance of Li[Ni⅓Co⅓Mn⅓]O2 Cathode Materials for Lithium Secondary Batteries," J. of the Electrochemical Society, 154 (3), A168-A172 (2007).

Thackeray et al., "Comments on the structural complexity of lithium-rich Li1+xM1−xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1−x)/3Mn(2−x)/3Nix/3Cox/3]O2 Cathodes with Low Irreversible Capacity Loss," Electrochemical and Solid State Letters, 9 (5) A221-A224 (2006).

Lopez et al., pending U.S. Appl. No. 12/332,735, "Positive Electrode Materials for High Discharge Capacity Lithium Ion Batteries," filed Dec. 11, 2008.

Buckley et al., pending U.S. Appl. No. 61/124,407, "High Energy Lithium Ion Secondary Batteries," filed Apr. 16, 2008.

Kumar, pending U.S. Appl. No. 61/101,432, "Layered Lithium Metal Oxide Cathode Battery Materials with High Energy Density," filed Sep. 30, 2008.

Hwang et al. "Influence of Mn content on the morphology and electrochemical performance of LiNi1−x−yCoxMnyO2 cathode materials," J. Mater. Chem., 2003; 13:1962-1968.

Thackeray et al., "Li2MnO3-stabilized LiMO2 (M=Mn, Ni, Co) electrodes for lithium -ion batteries," J. Mater. Chem., 2007; 17:3112-3125.

International Search Report and Written Opinion for International Application No. PCT/US2009/059519, dated May 18, 2010.

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.

Aurbach et al., "On the capacity fading of LiCoO2 intercalation electrodes: the effect of cycling, storage, temperature, and surface film forming additives," Electrochimica Acta 47 (2002) 4291-4306.

Chen et al., "Studies of LiCoO2 Coated with Metal Oxides," Electrochemical and Solid State Letters, 6 (11) A221-A224 (2003).

Chen et al., "Effect of a ZrO2 Coating on the Structure and Electrochemistry of LixCoO2 When Cycled to 4.5 V," Electrochemical and Solid-State Letters , 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of the Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO2 Cathode Material with Al2O3 Coating for a Li Ion Cell," Chem. Mater. 2000, 12 (12), 3788-3791.

Choi et al., "Superior Capacity Retention Spinel Oxyfluoride Cathodes for Lithium-Ion Batteries," Electrochemical and Solid-State Letters 9 (5) (2006) A245-A248.

Fey et al., "Enhanced cyclability of LiCoO2 cathodes coated with alumina derived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Ho et al., "Application of A-C Techniques to the Study of Lithium Diffusion in Tungsten Trioxide Thin Films," J. Electrochem. Soc., 1980; 127(2):343-350.

Ito et al., "The relationship between crystal structure and the electrochemical reaction of Li-rich insertion materials (2)" 2010.

Johnson et al. "The significance of the Li2MnO3 component in 'composite' xLi2MnO3·(1−x)LiMn0.5Ni0.5O2 electrodes," Electrochemistry Communications 6 (2004) 1085-1091.

Kang et al., "Enhancing the rate capability of high capacity xLi2MnO3·(1−x)LiMO2 (M=Mn, Ni, Co) electrodes by Li-Ni-PO4 treatment," Electrochemistry Communications 11 (2009) 748-751.

Kang et al., "Layered Li(Li0.2Ni0.15+0.5zCo0.10Mn0.55−0.5z)O2−zFz cathode materials for Li-ion secondary batteries," Journal of Power Sources 146 (2005) 654-657.

Kim et al., "Remarkable improvement in cell safety for Li[Ni0.5Co0.2Mn0.3]O2 coated with LiFePO4," Journal of Alloys and Compounds 492 (2010) L87-L90.

Kim et al., "Synthesis of spherical Li[Ni(⅓−z)Co(⅓−z)Mn(⅓−z)Mgz]O2 as positive electrode material for lithium ion battery," Electrochimica Acta 51 (2006) 2447-2453.

Kim et al., "Improvement of High-Voltage Cycling Behavior of Surface-Modified Li[Ni⅓Co⅓Mn⅓]O2 Cathodes by Fluorine Substitution for Li-Ion Batteries," Journal of the Electrochemical Society 152 (9) A1707-A1713 (2005).

Kim et al., "Electrochemical and Structural Properties of xLi2M'O3−(1−x)LiMn0.5Ni0.5O2 Electrodes for Lithium Batteries (M'=Ti, Mn, Zr; $0 \leq x \leq 0.3$)" Chem. Mater. 2004, 16, 1996-2006.

Kim et al., "Electrochemical Stability of Thin-Film LiCoO2 Cathodes by Aluminum-Oxide Coating," Chem. Mater. 2003, 15(7):1505-1511.

Lee et al., "Electrochemical characteristics of Al2O3-coated lithium manganese spinel as a cathode material for a lithium secondary battery," J. of Power Sources 126 (2004) 150-155.

Luo et al., "On the incorporation of fluorine into the manganese spinel cathode lattice," Solid State Ionics 180 (2009).

Myung et al., "Effect of AlF3 Coating on Thermal Behavior of Chemically Delithiated Li0.35[Ni⅓Co⅓Mn⅓]O2," J Phys. Chem. C, 114 (10): 4710-4718 (2010).

Okumura et al., "Cathode having high rate performance for a secondary Li-ion cell surface-modified by aluminum oxide nanoparticles," J. of Power Sources 189 (2009) 471-475.

Ohsawa et al., "The relationship between crystal structure and the electrochemical reaction of Li-rich insertion materials (1)," 2010.

Park et al., "Lithium-manganese-nickel-oxide electrodes with integrated layered-spinel structures for lithium batteries," Electrochemistry Communications 9 (2007) 262-268.

Song et al., "Two- and three-electrode impedance spectroscopy of lithium-ion batteries," J. of Power Sources, 2002; 111:255-267.

Sun et al., "The preparation and electrochemical performance of solid solutions LiCoO2-Li2MnO3 as cathode materials for lithium ion batteries," J of Power Sources 159 (2006) 1353-1359.

Sun et al., "Significant Improvement of high voltage cycling behavior AlF3-coated LiCoO2 cathode," Electrochemistry Communications 8 (2006) 821-826.

Thackeray et al., "Advances in manganese-oxide 'composite' electrodes for lithium-ion batteries," J. Mater. Chem., 2005,15, 2257-2267.

Yabuuchi et al., "Study of LiMnO3−Li(Co⅓Ni⅓Mn⅓)O2 for High Capacity Positive Electrode Material: II. Redox Reaction at the Positive Electrode/Electrolyte Interface," 2010.

Yoshii et al., "Study of LiMnO3−Li(Co⅓Ni⅓Mn⅓)O2 for High Capacity Positive Electrode Material: I. Change in the Crystal and Electronic Structure upon Li de-intercalation," 2010.

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).

Kang et al., "The Effects of Acid Treatment on the Electrochemical Properties of 0.5 Li2MnO3·0.5 LiNi0.44Co0.25Mn.031O2 Electrodes in Lithium Cells," Journal of the Electrochemical Society 153(6):A1186-A1192 (2006).

Search Report for European Patent Application No. 09819712.2, dated Apr. 12, 2012.

Ito et al, "Cyclic deterioration and its improvement for Li-rich layered cathode material Li [Ni0.17Li0.2Co0.07Mn0.56]O2," Journal of Power Sources, 195: 567-573 (2010).

Ito et al., "A new approach to improve the high-voltage cyclic performance of Li-rich layered cathode material by electrochemical pretreatment," Journal of Power Sources 183: 344-346 (2008).

Shin et al., "Improvement of electrochemical properties of Li[Ni0.4Co0.2Mn(0.4−x)]O2−yFy cathode materials at high voltage region", Electrochimica Acta 52 1477-1482 (2006).

* cited by examiner

POSITIVE ELECTRODE MATERIALS FOR LITHIUM ION BATTERIES HAVING A HIGH SPECIFIC DISCHARGE CAPACITY AND PROCESSES FOR THE SYNTHESIS OF THESE MATERIALS

FIELD OF THE INVENTION

The invention relates to positive electrode active materials for lithium secondary batteries that provide high specific discharge capacities following cycling at moderate rates. Furthermore, the invention relates to high specific discharge capacity compositions with a metal fluoride coating that significantly stabilizes and increases the discharge capacity during cycling. In addition, the invention relates methods for synthesizing high specific capacity positive electrode materials with a layered structure.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise lithium cobalt oxide ($LiCoO_2$). In practice, only roughly 50% of the theoretical capacity of the cathode can be used, e.g., roughly 140 mAh/g. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the cell. The second design category involves high energy cells, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In a first aspect, the invention pertains to a positive electrode active material for a lithium ion cell having a discharge capacity at a 10th discharge cycle of at least 240 mAh/g at room temperature at a discharge rate of C/3 when discharged from 4.6 volts to 2.0 volts.

In a further aspect, the invention pertains to a positive electrode active material for a lithium ion cell comprising a layered lithium metal oxide comprising +4 metal cations, +3 metal cations and +2 metal cations within a crystalline lattice. The material has a metal/metalloid fluoride coating wherein the positive electrode material has a first cycle irreversible capacity loss at a discharge rate of C/10 of no more than about ⅔ of the first cycle irreversible capacity loss of the uncoated material and a discharge capacity at the 20th cycle that is at least about 98% of the 5th cycle discharge capacity when discharged at room temperature at a discharge rate of C/3.

In an additional aspect, the invention pertains to a method for the synthesis of a layered lithium metal oxide composition. In some embodiments, the method comprises precipitating a mixed metal hydroxide composition from a solution comprising +2 cations wherein the hydroxide composition has a selected composition.

In another aspect, the invention pertains to a method for the synthesis of a layered lithium metal oxide composition. In some embodiments, the method comprises calcining at temperatures of at least about 750° C. a sol gel composition comprising lithium ions and +2 metal cations to form a crystalline layered lithium metal oxide composition.

DETAILED DESCRIPTION OF THE INVENTIONS

Figure 1:
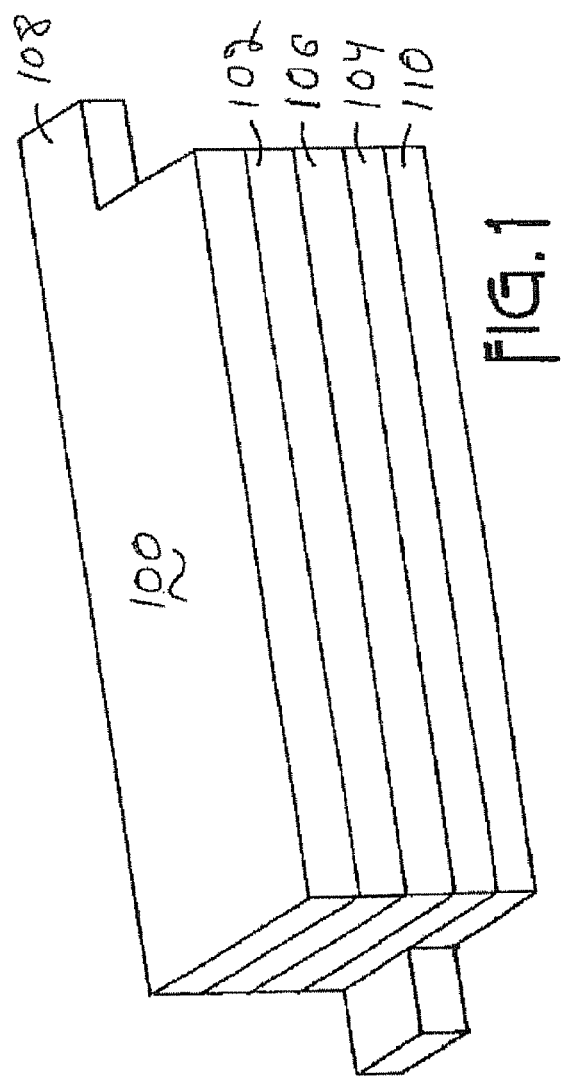
FIG. 1 is a schematic drawing of a battery structure separated from a container.

Lithium ion cell designs described herein achieve improved cycling performance while exhibiting high specific capacity. High specific capacity positive electrode materials are produced using techniques that yield improved material performance based on techniques that are scalable for commercial production. Suitable synthesis techniques include, for example, co-precipitation approaches and sol-gel approaches. The stoichiometries of the materials of particular interest have desirable properties for commercial applications. The materials have excellent cycling properties. Use of a metal fluoride coating or other suitable coatings provides further cycling enhancement. The positive electrode materials also exhibit a high average voltage over a discharge cycle so that the cells have high power output along with a high specific capacity. Furthermore, the positive electrode materials demonstrate a reduced proportion of irreversible capacity loss after the first charge and discharge of the cell so that negative electrode material can be correspondingly reduced if desired. The combination of excellent cycling performance and high specific capacity make these resulting lithium ion batteries an improved power source, particularly for high energy applications, such as electric vehicles, plug in hybrid vehicles and the like.

The batteries described herein are lithium ion batteries in which a non-aqueous electrolyte solution comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or a similar process during discharge such that the positive electrode functions as a cathode which consumes electrons during discharge. Upon recharging of the secondary cell, the flow of lithium ions is reversed through the cell with the negative electrode taking up lithium and with the positive electrode releasing lithium as lithium ions.

The lithium ion batteries can use a positive electrode active material that is lithium rich relative to a reference homogenous electroactive lithium metal oxide composition. While not wanted to be limited by theory, it is believed that appropriately formed lithium-rich lithium metal oxides have a composite crystal structure. For example, in some embodiments of lithium rich materials, a $Li_2MnO_3$ material may be structurally integrated with either a layered $LiMnO_2$ component or similar composite compositions with the manganese cations substituted with other transition metal cations with equivalent oxidation states. In some embodiments, the positive electrode material can be represented in two component notation as x $Li_2MO_3 \cdot (1-x)LiM'O_2$ where M' is one or more metal cations with an average valance of +3 with at least one cation being $Mn^{+3}$ or $Ni^{+3}$ and where M is one or more metal cations with an average valance of +4. These compositions are described further, for example, in U.S. Pat. No. 6,680,143 to Thackeray et al., entitled "Lithium Metal Oxide Electrodes for Lithium Cells and Batteries," incorporated herein by reference. Positive electrode active materials of particular interest have a formula $Li_{1+x}Ni_\alpha Mn_\beta Co_\gamma M_\delta O_{2-z}F_z$, where x ranges from about 0.05 to about 0.25, α ranges from about 0.1 to about 0.4, β range from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof. In particular, surprisingly good results have been obtain for $Li[Li_{0.2}Ni_{0.175}Co_{0.10}Mn_{0.525}]O_2$, as presented in the examples below. These compositions have a low risk of fire for improved safety properties due to their specific compositions with a layered structure and reduced amounts of nickel. These compositions use low amounts of elements that are less desirable from an environmental perspective, and can be produced from starting materials that have reasonable cost for commercial scale production.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

Thackeray et al. in the '143 patent describe the synthesis of layered lithium-rich lithium metal oxides using solid state reactions. As described herein, improved performance has been obtained using co-precipitation approaches, and generally a solution is formed from which a hydroxide is precipitated with the desired metal stoichiometry. The use of a lithium hydroxide as a precipitating agent reduces undesirable contamination from other cations such that higher capacities can be achieved. Sol-gel synthesis approaches have also yielded desirable hydroxide compositions that are formed by the hydrolysis of appropriate precursors. For the sol-gel process, the resulting gel has a hydroxide network comprising the metal ions introduced into the process. The hydroxide compositions from co-precipitation or sol-gel can be subsequently heat-treated to form the corresponding oxide composition with appropriate crystallinity. The lithium cations can either be incorporated into the initial co-precipitation or sol-gel process, or the lithium can be introduced in a solid state reaction during or following the heat treatment to form the oxide compositions from the hydroxide compositions. As demonstrated in the examples below, the resulting lithium rich metal oxide materials formed with the co-precipitation process have improved performance properties.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change. However, the capacity of the active materials is observed to decrease with cycling to varying degrees. Thus, after a number of cycles, the performance of the cell falls below acceptable values, and the cell is replaced. Also, on the first cycle of the cell, generally there is an irreversible capacity loss that it significantly greater than per cycle capacity loss at subsequent cycles. The irreversible capacity loss is the difference between the charge capacity of the new cell and the first discharge capacity. To compensate for this first cycle irreversible capacity loss, extra electroactive material is included in the negative electrode such that the cell can be fully charged even though this lost capacity is not accessible during most of the life of the cell so that negative electrode material is essentially wasted. The bulk of the first cycle irreversible capacity loss is generally attributed to the positive electrode material.

Appropriate coating materials can both improve the long term cycling performance of the material as well as decrease the first cycle irreversible capacity loss. While not wanting to be limited by theory, the coatings may stabilize the crystal lattice during the uptake and release of lithium ions so that irreversible changes in the crystal lattice are reduced significantly. In particular, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference.

It has been discovered that metal fluoride coatings can provide significant improvements for lithium rich layered positive electrode active materials described herein. These improvements relate to long term cycling with significantly reduced degradation of capacity, a significant decrease in first cycle irreversible capacity loss and an improvement in the capacity generally. The amount of coating material can be selected to accentuate the observed performance improvements.

As described herein, the lithium rich positive electrode active materials with the composite crystal structure can exhibit high specific capacity above 250 mAh/g at room temperature with good cycling properties for discharge from 4.6 volts. In general, the capacity of a cell during discharge depends on the rate of discharge. The maximum capacity of a specific cell is measured at very slow discharge rates. In actual use, the actual capacity is less than the maximum due to discharge at a finite rate. More realistic capacities can be measured using reasonable rates of discharge that are more similar to the rates during use. For low to moderate rate applications, a reasonable testing rate involves a discharge of the cell over three hours. In conventional notation this is written as C/3 or 0.33 C. The positive electrode active materials described herein can have a specific discharge capacity of at least about 250 mAh/g at a discharge rate of C/3 at the tenth discharge/charge cycle at room temperature when discharged from 4.6 volts. The greatest capacity performance has been obtained with coated materials.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. The batteries described herein that incorporate improved positive electrode active materials with respect to specific capacity and cycling can provide improved performance for consumers, especially for medium current applications.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation or similar mechanisms. Desirable mixed metal oxides are described further herein to function as electroactive materials for positive electrodes in secondary lithium ion batteries. Lithium ion batteries refer to batteries in which the negative electrode active material is also a lithium intercalation material. If lithium metal itself is used as the anode, the resulting battery generally is simply referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<x\leq1$ or $Li_{1+x}Ti_{2-x}O_4$, $0\leq x\leq\frac{1}{3}$. Additional negative electrode materials are described in copending provisional patent application Ser. No. 61/002,619 to Kumar, entitled "Inter-metallic Compositions, Negative Electrodes With Inter-Metallic Compositions and Batteries," and Ser. No. 61/125,476 to Kumar et al., entitled "Lithium Ion Batteries With Particular Negative Electrode Compositions," both of which are incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, ethylene-(propylene-diene monomer) copolymer (EPDM) and mixtures and copolymers thereof.

The particle loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast in contact with the current collector. For example, in some embodiments, the electrode material in contact with the current collector foil or other structure can be subjected to a pressure from about 2 to about 10 kg/cm² (kilograms per square centimeter). The pressed structure can be dried, for example in an oven, to remove the solvent from the electrode.

The separator is located between the positive electrode and the negative electrode. The separator is electrically insulating while providing for at least selected ion conduction between the two electrodes. A variety of materials can be used as separators. For example, glass fibers formed into a porous mat can be used as a separator. Commercial separator materials are generally formed from polymers, such as polyethylene and/or polypropylene that are porous sheets that provide for ionic conduction. Commercial polymer separators include, for example, the Celgar® line of separator material from Hoechst Celanese, Charlotte, N.C.

Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride and combinations thereof. Traditionally, the electrolyte comprises a 1 M concentration of the lithium salts.

For lithium ion batteries of interest, a non-aqueous liquid is generally used to dissolve the lithium salt(s). The solvent is generally inert and does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof.

The electrodes described herein can be incorporated into various commercial cell designs. For example, the cathode compositions can be used for prismatic shaped cells, wound cylindrical cells, coin cells or other reasonable cell shapes. The testing in the Examples is performed using coin cells. The cells can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the cells.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial cells include, for example, the cylindrical 18650 cells (18 mm in diameter and 65 mm long) and 26700 cells (26 mm in diameter and 70 mm long), although other cell sizes can be used.

Positive Electrode Active Materials

The positive electrode active materials comprise lithium intercalating metal oxide compositions. In some embodiments, the lithium metal oxide compositions can comprise lithium rich compositions that generally are believed to form a layered composite structure. The positive electrode active compositions can exhibit surprisingly high specific capacities in lithium ion cells under realistic discharge conditions. The desired electrode active materials can be synthesized using specific synthesis approaches described herein.

In some compositions of particular interest, the compositions can be described by the formula $Li_{1+x}Ni_\alpha Mn_\beta Co_\gamma M_\delta O_{2-z}F_z$, where x ranges from about 0.05 to about 0.25, α ranges from about 0.1 to about 0.4, β range from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof. The fluorine is a dopant that can contribute to cycling stability as well as improved safety of the materials. In embodiments in which z=0, this formula reduces to $Li_{1+x}Ni_\alpha Mn_\beta Co_\gamma M_\delta O_2$. It has been found that suitable coatings provide desirable improvements in cycling properties without the use of a fluorine dopant, although it may be desirable to have a fluorine dopant in some embodiments. Furthermore, in some embodiments it is desirable to have δ=0 such that the compositions are simpler while still providing improved performance. For these embodiments, if z=0 also, the formula simplifies to $Li_{1+x}Ni_\alpha Mn_\beta Co_\gamma O_2$, with the parameters outlined above.

With respect to some embodiments of materials described herein, Thackery and coworkers have proposed a composite crystal structure for some lithium rich metal oxide compositions in which a $Li_2MO_3$ composition is structurally integrated into a layered structure with a $LiMO_2$ component. The electrode materials can be represented in two component notation as a $Li_2M'O_3 \cdot (1-a)LiMO_2$, where M is one or more metal elements with an average valance of +3 and with at least one element being Mn or Ni and M' is a metal element with an average valance of +4 and 0<a<1. For example, M can be a combination of $Ni^{+2}$, $Co^{+3}$ and $Mn^{+4}$. The overall formula for these compositions can be written as $Li_{1+x}M'_{2x}M_{1-3x}O_2$. Batteries formed from these materials have been observed to cycle at higher voltages and with higher capacities relative to batteries formed with corresponding $LiMO_2$ compositions. These materials are described further in U.S. Pat. No. 6,680,143 to Thackery et al., entitled Lithium Metal Oxide Electrodes for Lithium Cells and Batteries," and U.S. Pat. No. 6,677,082 to Thackery et al., entitled "Lithium Metal Oxide Electrodes for Lithium Cells and Batteries," both of which are incorporated herein by reference. Thackery identified Mn, Ti and Zr as being of particular interest as M' and Mn and Ni for M.

The structure of some specific layered structures is described further in Thackery et al., "Comments on the structural complexity of lithium-rich $Li_{1+x}M_{1-x}O_2$ electrodes (M=Mn,Ni,Co) for lithium batteries," Electrochemistry Communications 8 (2006) 1531-1538, incorporated herein by reference. The study reported in this article reviewed compositions with the formulas $Li_{1+x}[Mn_{0.5}Ni_{0.5}]_{1-x}O_2$ and $Li_{1+x}[M_{0.333}Ni_{0.333}Co_{0.333}]_{1-x}O_2$. The article also describes the structural complexity of the layered materials.

Recently, Kang and coworkers described a composition for use in secondary batteries with the formula $Li_{1+x}Ni_\alpha Mn_\beta Co_\gamma M'_\delta O_{2-z}F_z$, M'=Mg, Zn, Al, Ga, B, Zr, Ti, x between about 0 and 0.3, α between about 0.2 and 0.6, β between about 0.2 and 0.6, γ between about 0 and 0.3, δ between about 0 and 0.15 and z between about 0 and 0.2. The metal ranges and fluorine were proposed as improving battery capacity and stability of the resulting layered structure during electrochemical cycling. See U.S. Pat. No. 7,205,072, to Kang et al., entitled "Layered cathode materials for lithium ion rechargeable batteries," incorporated herein by reference. This reference reported a cathode material with a capacity below 250 mAh/g (milli-ampere hours per gram) at room temperature after 10 cycles. It is noted that if fluorine is substituted for oxygen, the oxidation state of the multivalent metals are lower relative to the oxidation state of the compositions without the fluorine. Kang et al. examined various specific compositions including $Li_{1.2}Ni_{0.15}Mn_{0.55}C_{0.10}O_2$, which is the composition examined in the examples below. The results obtained in this patent involved a solid state synthesis of the materials that did not achieve comparable cycling capacity.

Synthesis Methods

Synthesis approaches described herein can be used to form layered lithium rich cathode active materials with improved specific capacity upon cycling. The synthesis methods have been adapted for the synthesis of compositions with the formula $Li_{1+x}Ni_\alpha Mn_\beta Co_\gamma M_\delta O_{2-z}F_z$, where x ranges from about 0.05 to about 0.25, α ranges from about 0.1 to about 0.4, β ranges from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof. The synthesis approaches are also suitable for commercial scale up. Specifically, co-precipitation process and sol-gel processes can be used to synthesize the desired lithium rich positive electrode materials with desirable results. A lithium fluoride reactant can be added to the reactants, generally along with an appropriate amount of lithium hydroxide, to introduce a fluorine dopant.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 0.1M and 2M. The relative molar quantities of metal salts can be selected based on the desired formula for the product materials. The pH of the solution can then be adjusted, such as with the addition of lithium hydroxide and/or ammonium hydroxide, to precipitate a metal hydroxide with the desired amounts of metal elements. Generally, the pH can be adjusted to a value between about 10 and about 12 pH units to perform the precipitation. The solution can be heated and stirred to facilitate the precipitation of the hydroxide. The precipitated metal hydroxide can then be separated from the solution, washed and dried to form a powder prior to further processing. For example, drying can be performed in an oven at about 110° C. for about 4 to about 12 hours.

The collected metal hydroxide powder can then be subjected to a heat treatment to convert the hydroxide composition to the corresponding oxide composition with the elimination of water. Generally, the heat treatment can be performed in an oven, furnace or the like. The heat treatment can be performed in an inert atmosphere or an atmosphere with oxygen present. In some embodiments, the material can be heated to a temperature of at least about 300° C. and in some embodiments from about 350° C. to about 1000° C. to convert the hydroxide to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiment from about 700° C. to about 1200° C., and in further embodiments from about 750° C. to about 1100° C. The calcination step to improve the structural properties of the powder generally can be performed for at least about 15 minutes, in further embodiments from about 20 minutes to about 30 hours or longer, and in other embodiments from about 30 minutes to about 24 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, LiOH or a combination thereof, can be mixed with the precipitated metal hydroxide. The powder mixture is then advanced through the heating step(s) to form the oxide and then the crystalline final product material.

In the sol-gel approach, metal salts, such as metal acetates or other soluble metal compounds, are again dissolved into an aqueous solvent, such as purified water. In general, it is desirable for the anion of the salt to be selected to decompose during a subsequent heating step so that the anion is removed from the system. In some embodiments, either acetates or nitrates can be used as the soluble metal compounds. The acetate metal salts however are more environmentally benign because of the absence of any toxic gas evolution during the decomposition process to form the oxides. In contrast, nitrates form $NO_x$ gas during the decomposition process. An acid can be added to hydrolyze the metal solution to form a hydroxide network. For example, a glycolic/tartaric acid solution can be used. Ammonium hydroxide can be used to adjust the pH to a value of about 7. The amount of acid and corresponding pH can be selected to control the gel formation process. Some heating of the solution can be used to facilitate the formation of the gel. The resulting gel can be harvested and dried. The harvested gel can be heat treated first at a temperature from about 300° C. to about 600° C. for 15 minutes to about 24 hours to decompose the gel. The heat treatment may in principle remove the carboxylic acid and other volatile components of the gel as well as converting the hydroxide to the oxide. As discussed by Fey at al. (Materials Chemistry & Physics, Vol. 87, 2004, pp. 246-255, incorporated herein by reference), the carboxylic acid has an effect on the enthalpy for the oxide formation since the carboxylic acid generally decomposes during the heat treatment. A calcination step at from about 800° C. to about 1200° C. for from 30 minutes to about 48 hours then can be used to form the final layered composition. A person of ordinary skill in the art will recognize that additional ranges of temperature and times for processing the sol-gel materials are contemplated and are within the present disclosure.

Coatings and Methods for Forming the Coatings

Metal fluoride coatings have been found to significantly improve the performance of the lithium rich layered positive electrode active materials described herein. In particular, the cycling properties have been found to significantly improve. However, the overall capacity also shows desirable properties with the fluoride coating, and the irreversible capacity loss of the first cycle is reduced. The coating provides a surprising improvement in the performance of the high capacity lithium rich compositions described herein. In general, a selected metal fluoride or metalloid fluoride can be used for the coating. Similarly, a coating with a combination of metal and/or metalloid elements can be used.

Metal/metalloid fluoride coatings have been proposed to stabilize the performance of positive electrode active materials for common materials for lithium secondary batteries. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930A to Sun et al., entitled "Cathode Active Materials Coated With Fluorine Compound for Lithium Secondary Batteries and Method for Preparing the Same," incorporated herein by reference. This patent application provides results for coated $LiCoO_2$ with LiF, $ZnF_2$ or $AlF_3$. The Sun PCT application referenced above specifically refers to the following fluoride compositions, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TMF_3$, $YF_3$, $YbF_3$, $TlF_3$, $CeF_4$, $GeF_4$, $HfF_4$, $SiF_4$, $SnF_3$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

The effect of an $AlF_3$ coating on the cycling performance of $LiN_{1/3}Co_{1/3}Mn_{1/3}O2$ is described further in an article to Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154 (3), A168-A172 (2007). Also, the effect of an $AlF_3$ coating on the cycling performance of $LiNi_{0.8}Co_{0.1}Mn_{0.1}O_2$ is described further in an article to Woo et al., "Significant Improvement of Electrochemical Performance of $AlF_3$-Coated $Li[Ni_{0.8}Co_{0.1}Mn_{0.1}]O_2$ Cathode Materials," J. of the Electrochemical Society, 154 (11) A1005-A1009 (2007), incorporated herein by reference. A reduction in irreversible capacity loss was noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference.

It has been found that metal/metalloid fluoride coatings can significantly improve the performance of lithium rich layered compositions for lithium ion secondary batteries as demonstrated in the examples below. In general, the amount of coating can be selected to balance the beneficial stabilization resulting from the coating with the loss of specific capacity due to the weight of the coating material that generally does not contribute directly to a high specific capacity of the material. In general, the amount of coating material ranges from about 0.005 mole percent to about 10 mole percent, in further embodiments from about 0.5 mole percent to about 7 mole percent and in other embodiments from about 2.0 mole percent to about 3.5 mole percent. A person of ordinary skill in the art will recognize that additional ranges of coating material within the explicit ranges above are contemplated and are within the present disclosure. The amount of $AlF_3$ effective in $AlF_3$ coated metal oxide materials to improve the capacity of the uncoated material is related to the particle size and surface area of the uncoated material. In particular, a higher mole percentage of metal fluoride coating generally can be used for a higher surface area powder to achieve an equivalent effect relative to a coating on a lower surface area powder.

The fluoride coating can be deposited using a precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired amount of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

Battery Performance

Batteries formed from the improved positive electrode active materials described herein have demonstrated superior performance under realistic discharge conditions for moderate current applications. Specifically, the active materials have demonstrated an improved specific capacity upon cycling of the cells at moderate discharge rates. Furthermore, the coated materials have demonstrated improved cycling out to a large number of cycles. In some embodiments, coated electroactive materials demonstrate a significant reduction in the first cycle irreversible capacity loss relative to the uncoated materials.

In general, various similar testing procedures can be used to evaluate the battery performance. A specific testing procedure is described for the evaluation of the performance values described herein. The testing procedure is described in more detail in the examples below. Specifically, the cell can be cycled between 4.6 volts and 2.0 volts at room temperature, although other ranges can be used with correspondingly different results. The evaluation over the range from 4.6 volts to 2.0 volts is desirable for commercial use since the cells generally have stable cycling over this voltage range. For the first three cycles, a cell is discharged at a rate of C/10 to establish irreversible capacity loss. The cell is then cycled for three cycles at C/5. For cycle 7 and beyond, the cell is cycled at a rate of C/3, which is a reasonable testing rate for medium current applications. Again, the notation C/x implies that the cell is discharged at a rate to fully discharge the cell to the selected voltage minimum in x hours. The cell capacity depends significantly on the discharge rate, with lose of capacity as the discharge rate increases.

In some embodiments, the positive electrode active material has a specific capacity during the tenth cycle at a discharge rate of C/3 of at least about 240 milliamp hours per gram (mAh/g) and in additional embodiments from about 245 mAh/g to about 270 mAh/g. The irreversible capacity loss for the coated electroactive materials can be decreased at least about 25%, and in further embodiments from about 30% to about 60% relative to the equivalent performance of the uncoated materials. A person of ordinary skill in the art will recognize that additional ranges of specific capacity and of decreases in irreversible capacity loss are contemplated and are within the present disclosure.

EXAMPLES

The coin cells tested in Examples 1-8 were all performed using coin cells produced following a procedure outlined here. The lithium metal oxide (LMO) powders were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Honeywell—Riedel-de-Haen) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film using a doctor's blade coating process.

A positive electrode material was formed by drying the aluminum foil current collector with the thin wet film in vacuum oven at 110° C. for about two hours to remove NMP. The positive electrode material was pressed between rollers of a sheet mill to obtain a positive electrode with desired thickness. An example of a positive electrode composition developed using above process having a LMO:acetylene black:graphite:PVDF ratio of 80:5:5:10 is presented below.

The positive electrode was placed inside an argon filled glove box for the fabrication of the coin cells. Lithium foil (FMC Lithium) having thickness of 125 micron was used as a negative electrode. The electrolyte was a 1 M solution of $LiPF_6$ form by dissolving $LiPF_6$ salt in a mixture of ethylene carbonate, diethyl carbonate and dimethyl carbonate (from Ferro Corp., Ohio USA) at a 1:1:1 volumetric ratio. A trilayer (polypropylene/polyethylene/polypropylene) micro-porous separator (2320 from Celgard, LLC, N.C., USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell. The resulting coin cells were tested with a Maccor cycle tester to obtain charge-discharge curve and cycling stability over a number of cycles. All the electrochemical data contained herein have been cycling at three rates, 0.1 C (C/10), 0.2 C (C/5) or 0.33 C (C/3).

Example 1

Reaction of Metal Acetate with $LiOH/NH_4OH$ to Form Lithium Metal Oxide

This example demonstrates a co-precipitation process based on metal acetates that are precipitated as hydroxides that are subsequently processed into the desired oxide. Lithium is incorporated in the initial precipitation step.

The processing in this example was performed in an oxygen free atmosphere. Stoichiometric amounts of lithium acetate, nickel acetate, cobalt acetate and manganese acetate in appropriate mole ratio were dissolved in water to form a saturated transition metal acetate solution containing Ni, Co, Mn ions. A saturated solution comprising lithium hydroxide (LiOH) and at least twice the concentration of ammonium hydroxide ($NH_4OH$) in required mole ratio was also prepared. The transition metal acetate solution was dripped slowly into the $LiOH/NH_4OH$ solution to allow the formation of precipitates of transition metal hydroxides. Upon completion of the addition of the transition metal acetate solution, the reaction mixture was slowly warmed up to 110° C. briefly. The reaction mixture is subsequently warmed up to 140° C. to remove water through evaporation. Upon substantial removal of water from the reaction mixture, the mixture turned to a viscous semi-solid mass. The semi-solid mass was transferred to a large volume crucible and heated slowly to 480° C. for 10 h. The solid obtained after the calcination is gently ground to form a brownish-black LMO powder, which was calcined at 800~1000° C. to improve electrochemical performance. The product composition was $Li_{1.2}Ni_{0.175}Co_{0.10}Mn_{0.525}O_2$.

Figure 2:
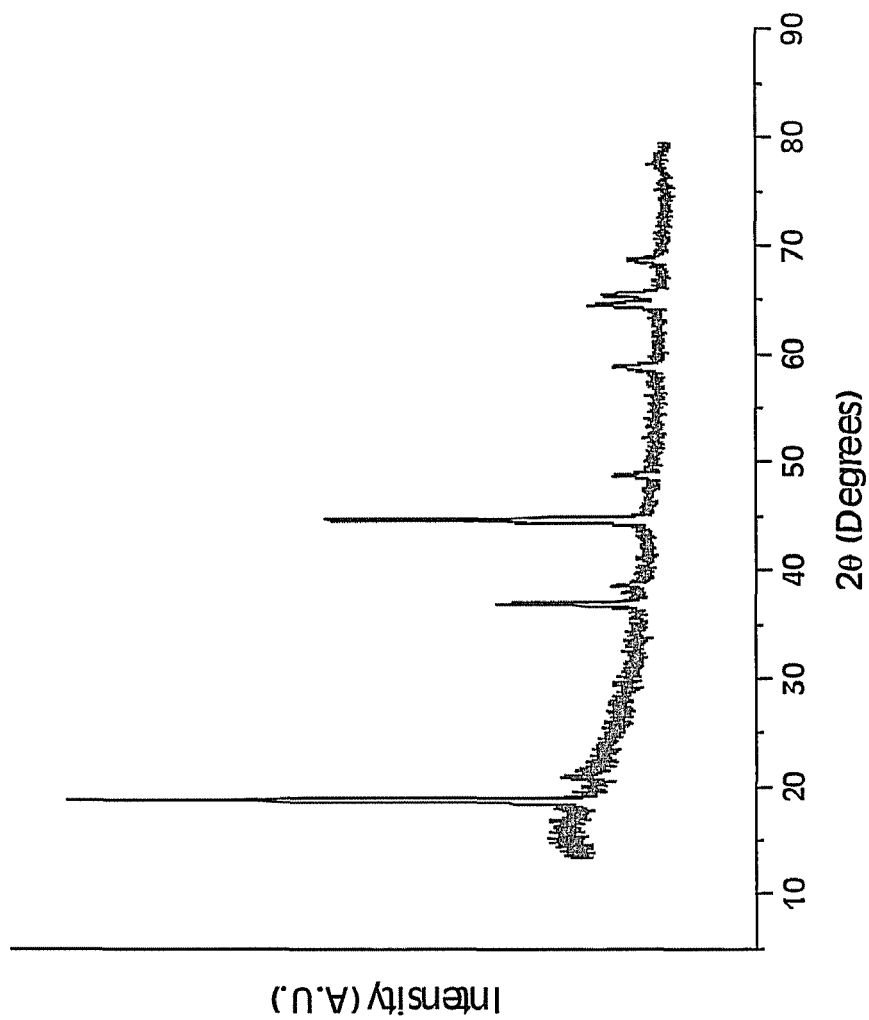
FIG. 2 is an X-ray diffraction pattern of a sample described in example 1.
Figure 3:
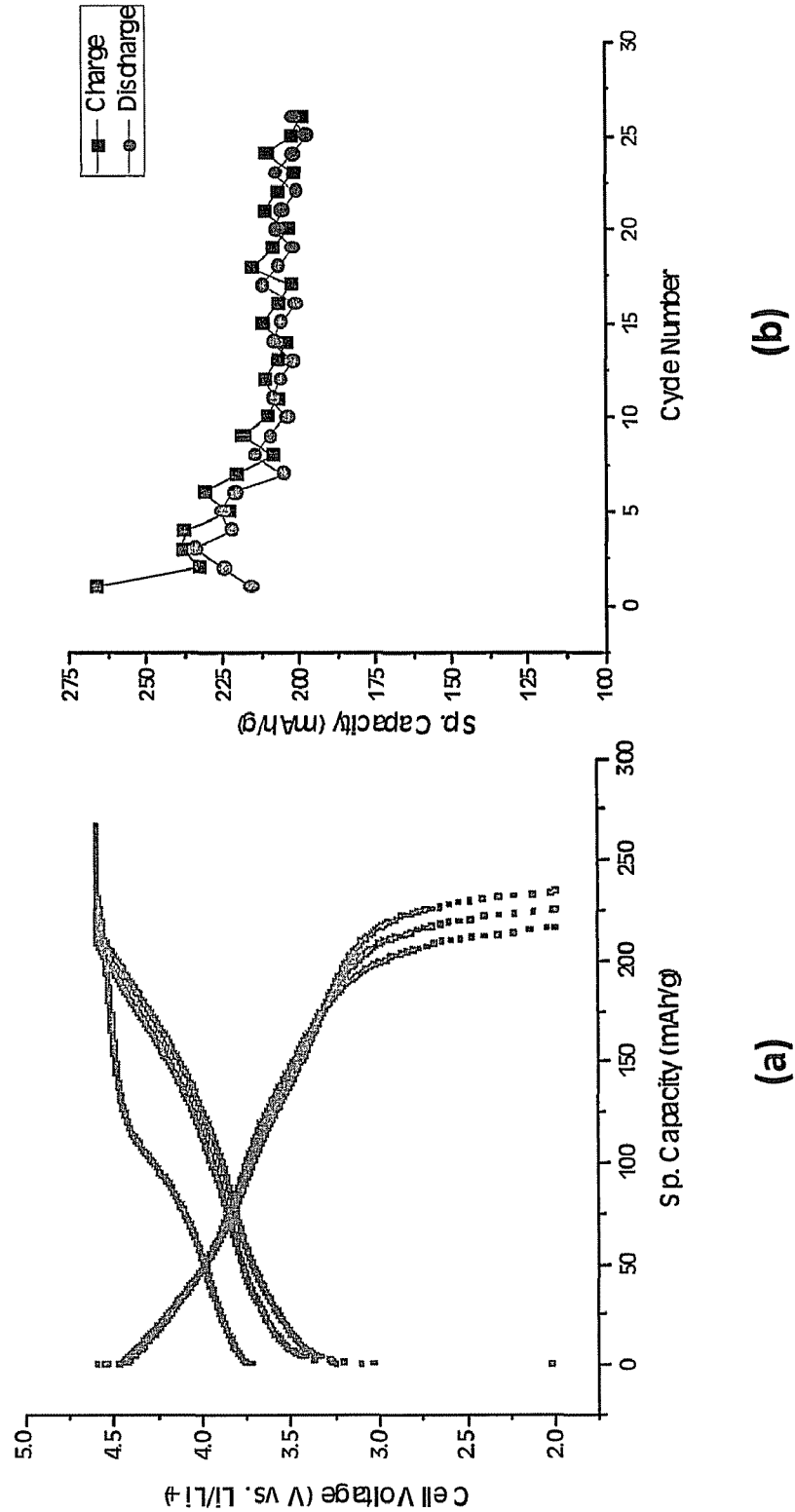
FIG. 3 shows plots of (a) voltage versus specific capacity and (b) specific capacity versus cycle life of a battery formed from the sample material described in example 1.

The LMO powder was measured by X-ray and the X-ray diffraction pattern of the powder is shown in FIG. 2. The LMO powder was used to form a coin cell following the procedure outlined above. The coin cell was tested, and the plots of voltage versus specific capacity and specific capacity versus cycle life are shown in FIGS. 3a and 3b, respectively.

Example 2

Reaction of Metal Acetate with LiOH to Form Lithium Metal Oxide

This example demonstrates the synthesis of the positive electrode material using a hydroxide co-precipitation approach in which the lithium is introduced in a solid state reaction involving a mixed metal hydroxide.

The processing in this example through the formation of the dried precipitate was performed in an oxygen free atmosphere. Stoichiometric amounts of nickel acetate (Ni $(CH_3COO)_2.xH_2O$), cobalt acetate ($Co(CH_3COO)_2.xH_2O$) and manganese acetate ($Mn(CH_3COO)_2.xH_2O$) were dissolved in distilled water to form a metal acetate solution. The metal acetate solution was added continuously to a stirred solution of aqueous LiOH solution to allow metal hydroxide to precipitate. The reaction mixture was kept between room temperature and 80° C. with pH around 10-12. The rate of the metal acetate addition, the speed of the stirring, the temperature and pH value of the reaction mixture were adjusted to control the morphology, size and electronic properties of the precipitated particles. In some embodiments, the aqueous metal acetate solution has a concentration of 1M to 3M and the aqueous LiOH solution has a concentration of 1M to 3M. The lithium hydroxide solution is used to provide $OH^-$ ion to form metal hydroxide precipitate during the process. Although residual amount of the LiOH may present in the metal hydroxide after the subsequent filtration and washing steps discussed below, majority of the lithium was washed out as soluble salts.

The metal hydroxide precipitate was filtered, washed multiple times with distilled water, and dried in a vacuum oven under a nitrogen atmosphere at 110° C. for 16 hrs to afford a dried metal hydroxide powder. An appropriate amount of LiOH powder was combined with the dried metal hydroxide powder and thoroughly mixed with a Jar Mill, double planetary mixer, or dry powder mixer. The mixed powders are calcined at 400° C. for 8 hrs in air followed by an additional mixing step to further homogenize the powder formed. The homogenized powder was again calcined at 900° C. for 12 hr in air to form the lithium composite oxide powder (LMO). The product composition was $Li_{1.2}Ni_{0.175}Co_{0.10}Mn_{0.525}O_2$.

Figure 4:
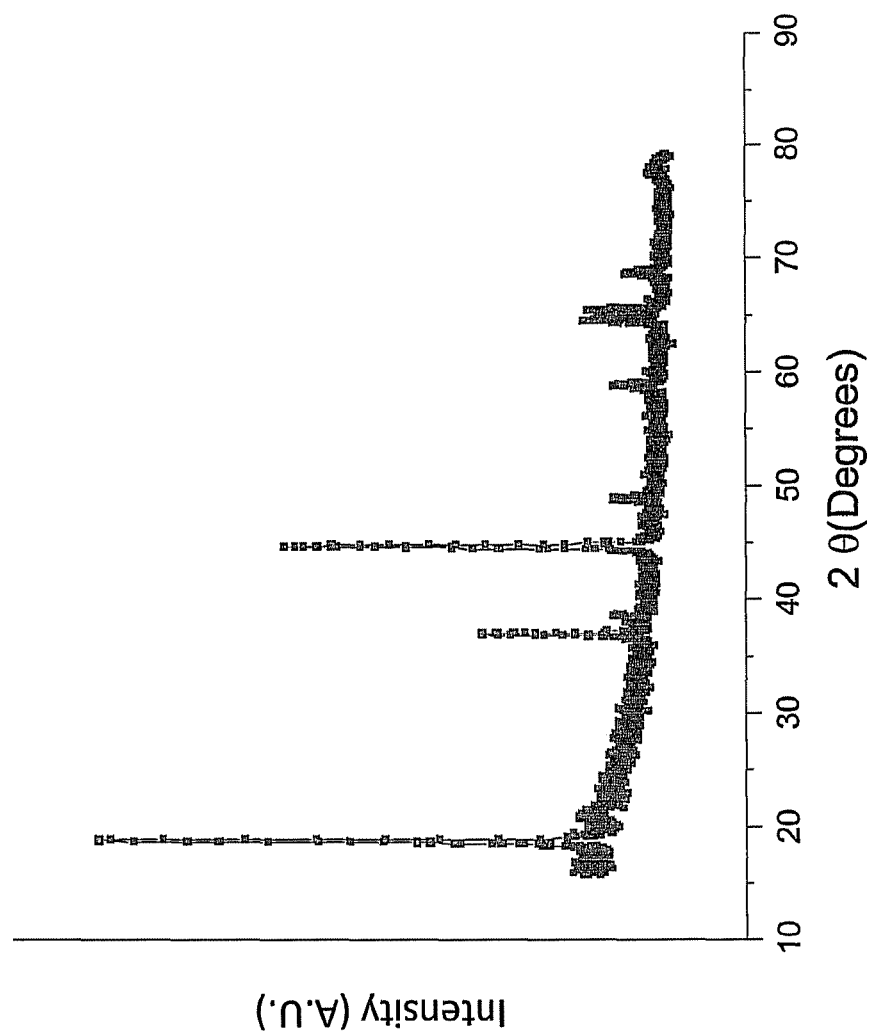
FIG. 4 is an X-ray diffraction pattern of a sample described in example 2.
Figure 5:
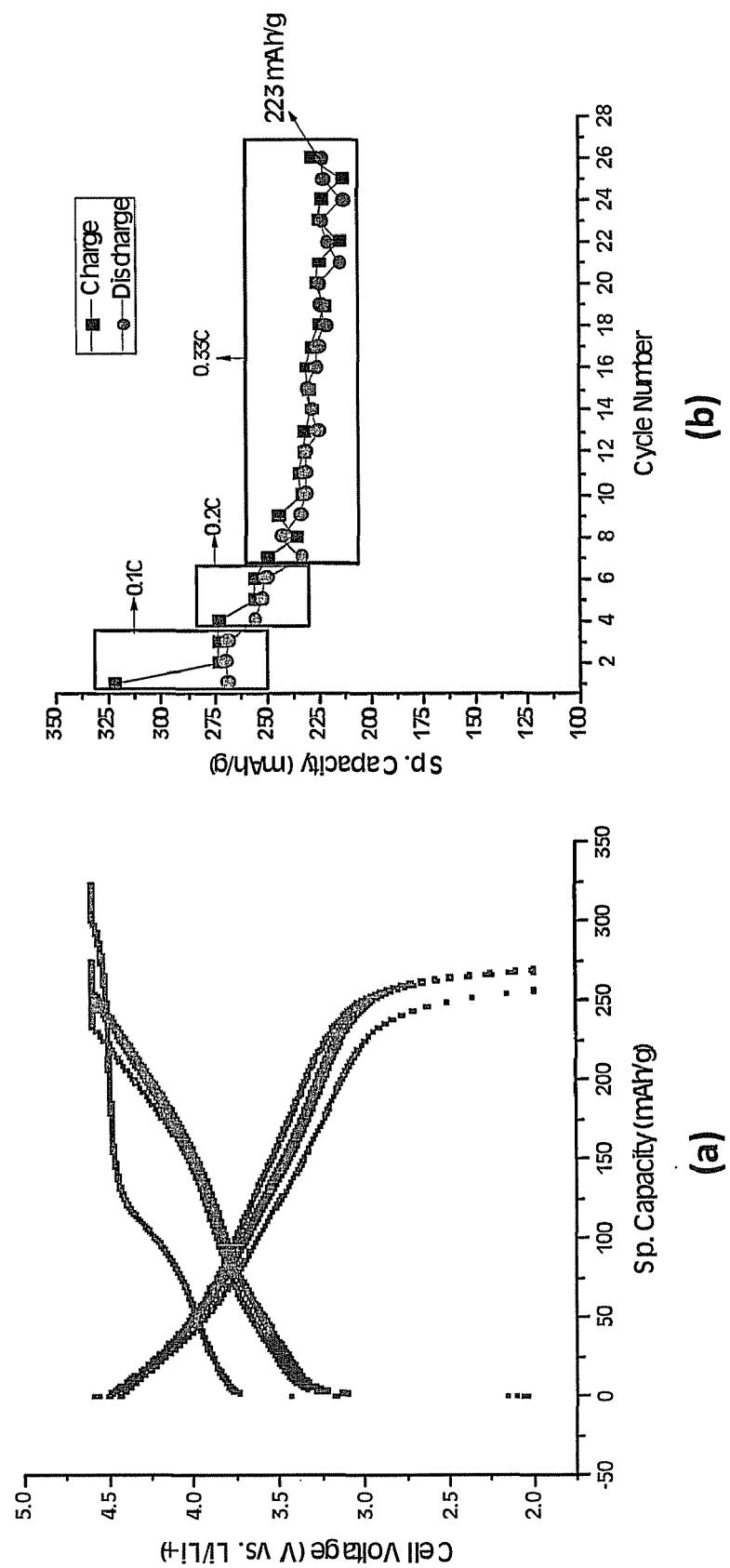
FIG. 5 shows plots of (a) voltage versus specific capacity and (b) specific capacity versus cycle life of a battery formed from the sample material described in example 2.

The LMO powder was measured by X-ray and the X-ray diffraction pattern of the powder is shown in FIG. 4. The LMO powder was used to form coin cell following the procedure outlined above. The coin cell formed was tested and the plots of voltage versus specific capacity and specific capacity versus cycle life are shown in FIGS. 5a and 5b, respectively. First three cycles were obtained at a discharge rate of 0.1 C. The next three cycles were measured with a rate of 0.2 C. The subsequently cycles were measured with a rate of 0.33 C.

Example 3

Reaction of Metal Sulfate with $NaOH/NH_4OH$ to Form Lithium Metal Oxide

This example demonstrates a co-precipitation process based on metal sulfate starting materials with base provided as a mixture of sodium hydroxide and ammonium hydroxide.

The processing in this example through the formation of the dried precipitate was performed in an oxygen free atmosphere. Stoichiometric amounts of metal sulfates (NiSO$_4$.xH$_2$O, CoSO$_4$.xH$_2$O, & MnSO$_4$.xH$_2$O) were dissolved in distilled water to form a metal sulfate aqueous solution. Separately an aqueous solution with a mixture of NaOH and NH$_4$OH was prepared. The two solutions were gradually added to a reaction vessel to form a metal hydroxide precipitate. During the precipitation step, the reaction mixture was stirred at while the temperature of the reaction mixture was kept between room temperature and 80° C. The pH of the reaction mixture was about 10-12. The aqueous metal sulfate solution had a concentration from 1M to 3M, while the aqueous NaOH/NH$_4$OH solution had a NaOH concentration from 1M to 3M and a NH$_4$OH concentration from 0.2-2M. The metal hydroxide precipitate was filtered, washed multiple times with distilled water, and dried at 110° C. for 16 hrs to form a metal hydroxide powder.

An appropriate amount of LiOH powder was combined with the dried metal hydroxide powder and thoroughly mixed by a Jar Mill, double planetary mixer, or dry powder mixer to form a homogenous powder mixture. The homogenized powders were calcined at 500° C. for 10 hrs in air followed by an additional mixing step to further homogenize the resulting powder. The homogenized powder was again calcined at 900° C. for 12 hr in air to form the lithium composite oxide powder (LMO). The product composition was Li$_{1.2}$Ni$_{0.175}$Co$_{0.10}$Mn$_{0.525}$O$_2$.

Figure 6:
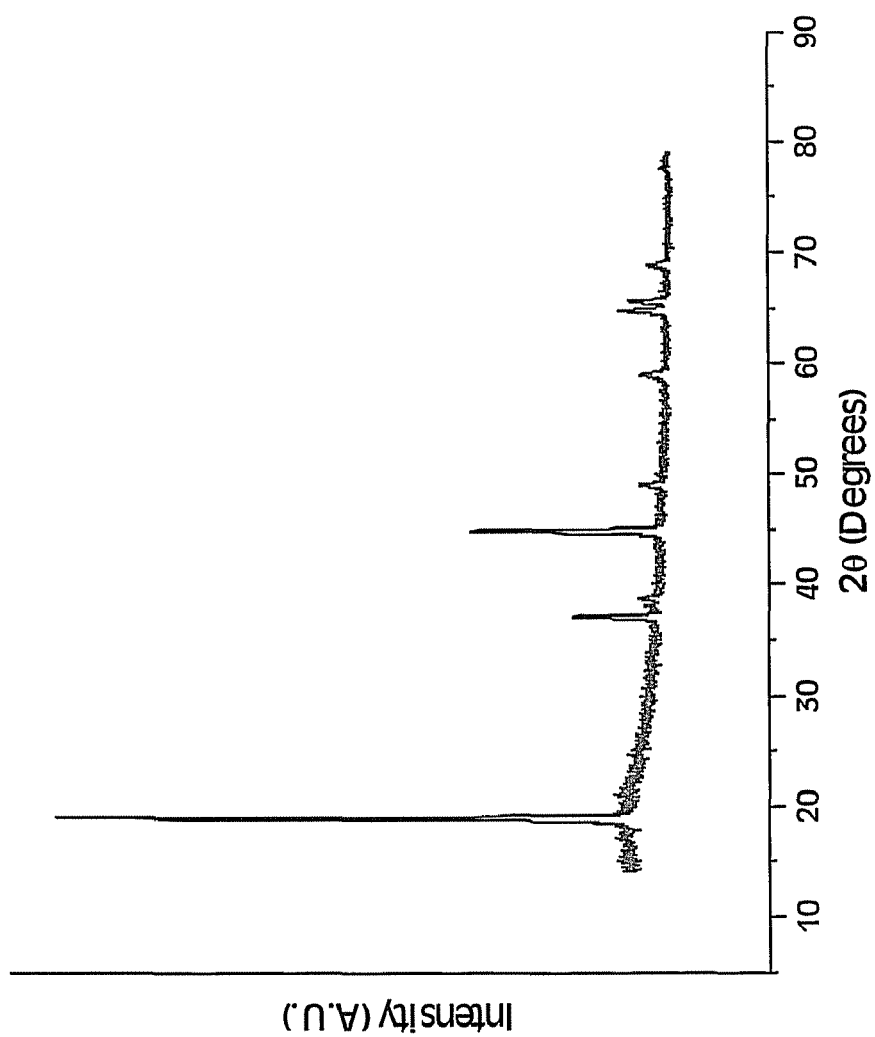
FIG. 6 is an X-ray diffraction pattern of a sample described in example 3.
Figure 7:
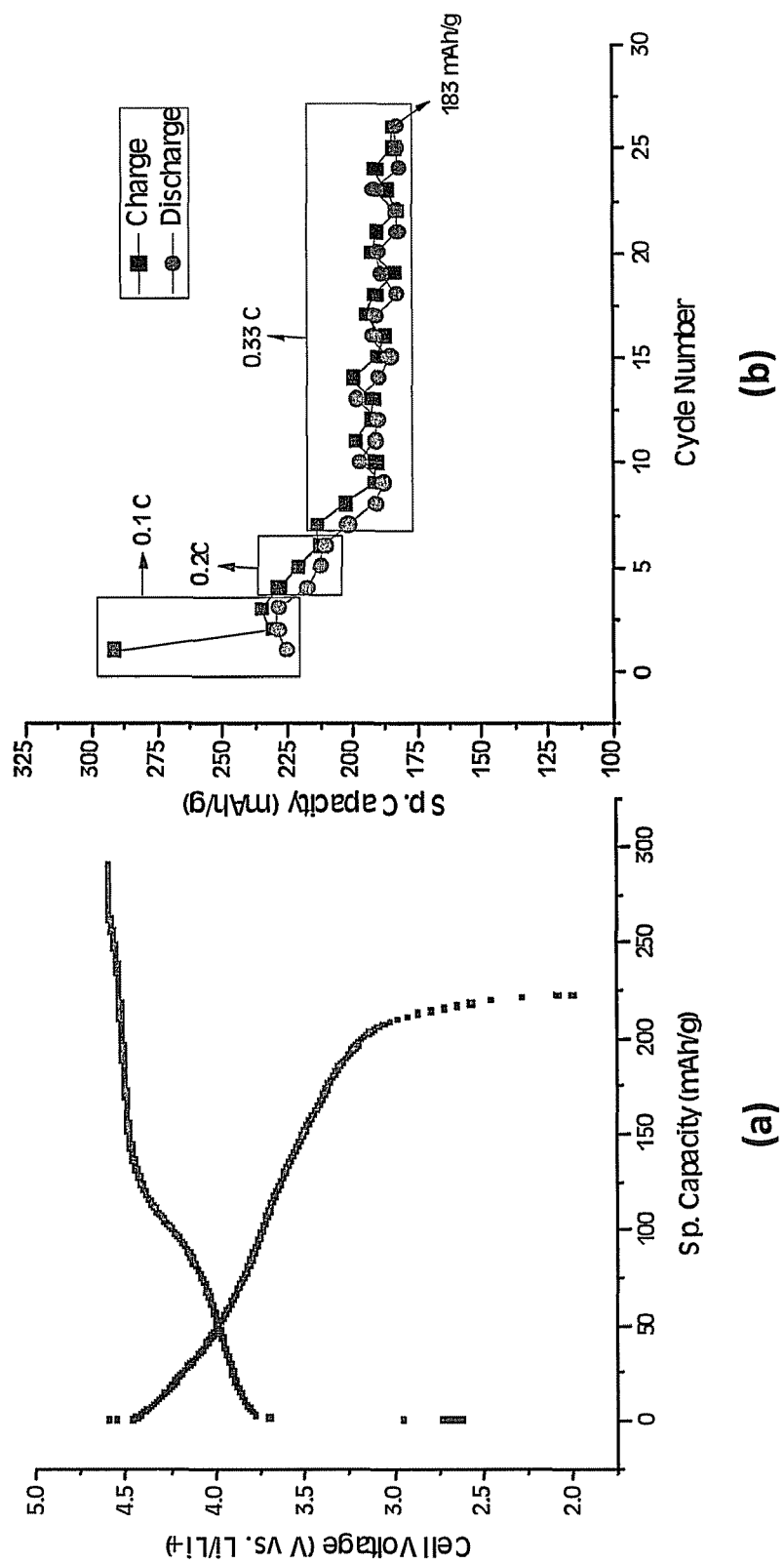
FIG. 7 shows plots of (a) voltage versus specific capacity and (b) specific capacity versus cycle life of a battery formed with the sample material described in example 3.

The LMO powder was measured by X-ray and the X-ray diffraction pattern of the powder is shown in FIG. 6. The LMO powder was used to form coin cell following the procedure outlined above. The coin cell formed was tested and the plots of voltage versus specific capacity and specific capacity versus cycle life are shown in FIGS. 7a and 7b, respectively. First three cycles were measured at a discharge rate of 0.1 C. The next three cycles were measured at a rate of 0.2 C. The subsequently cycles were measured at a rate of 0.33 C.

Example 4

Reaction of Metal Acetate with NaOH/NH$_4$OH to Form Lithium Metal Oxide

The process described in Example 3 was repeated using stoichiometric amounts of nickel acetate (Ni(CH$_3$COO)$_2$.xH$_2$O), cobalt acetate (Co(CH$_3$COO)$_2$.xH$_2$O) and manganese acetate (Mn(CH$_3$COO)$_2$.xH$_2$O) instead of the metal sulfates to form the metal hydroxide precipitate. Following reaction with the lithium hydroxide, a lithium composite oxide powder (LMO) was formed. The homogenized powder was again calcined at 900° C. for 12 hr in air to form the lithium composite oxide powder (LMO). The product composition was Li$_{1.2}$Ni$_{0.175}$Co$_{0.10}$Mn$_{0.525}$O$_2$.

Figure 8:
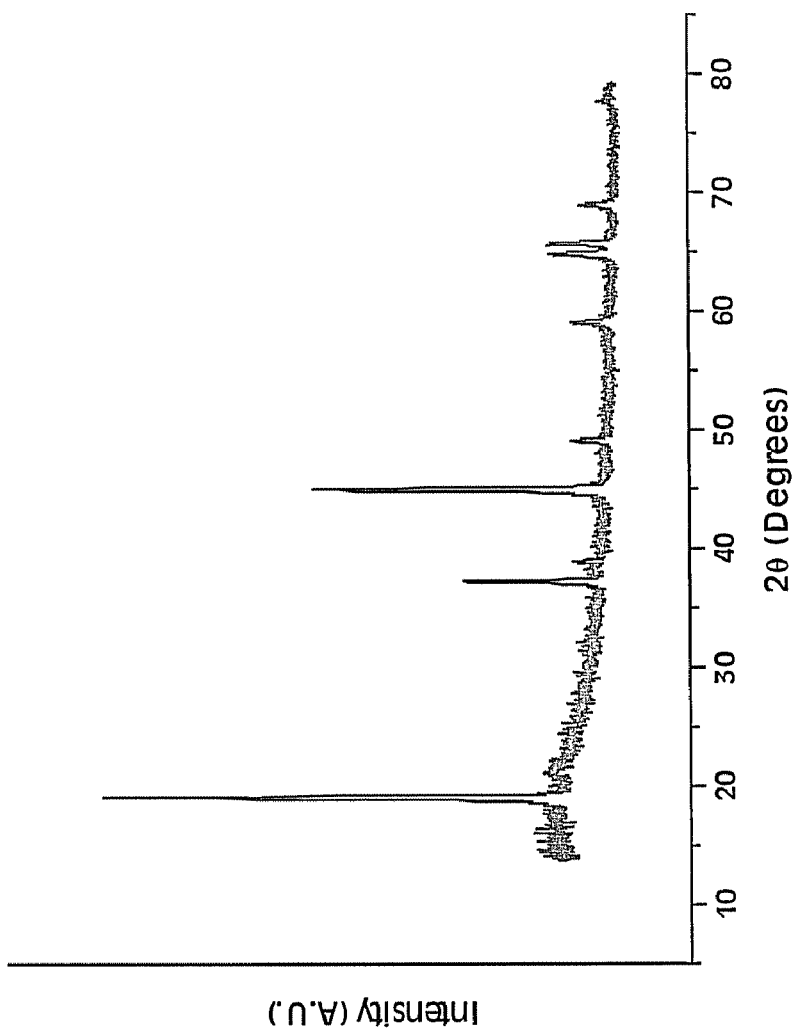
FIG. 8 is an X-ray diffraction pattern of a sample described in example 4.
Figure 9:
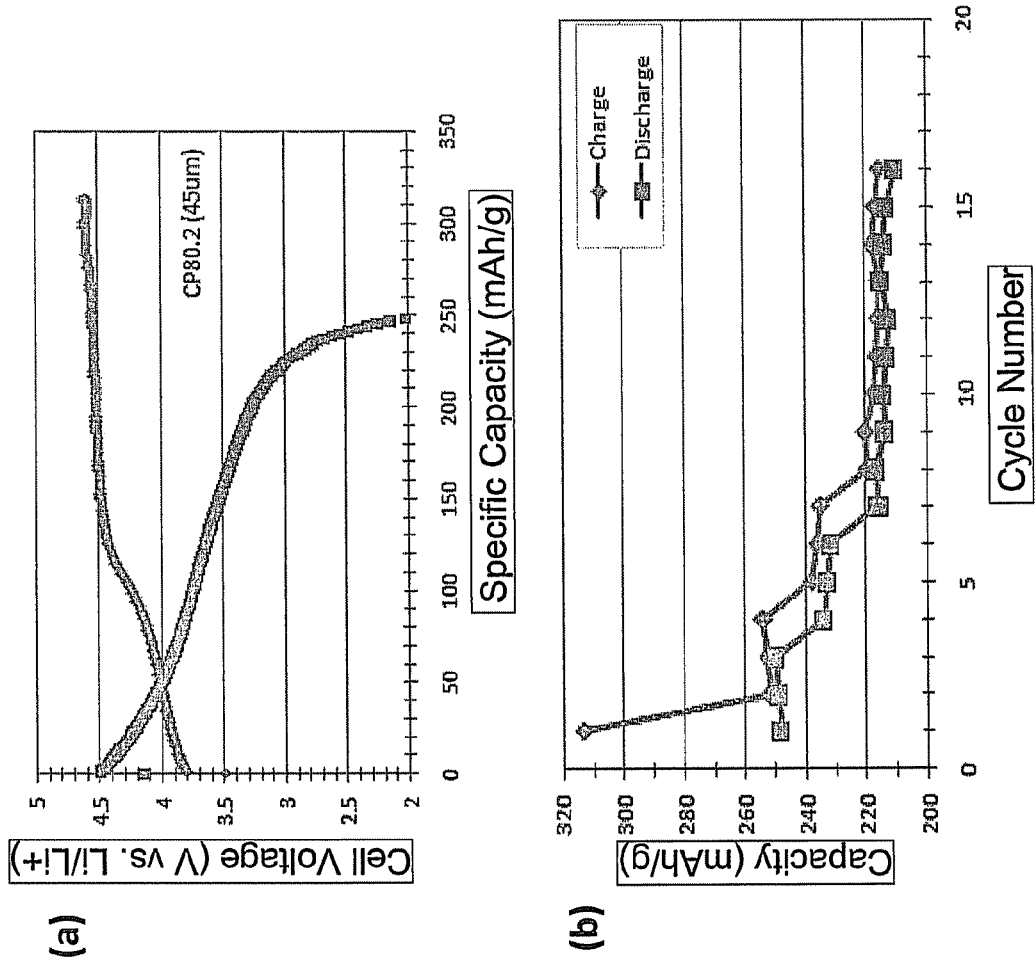
FIG. 9 shows plots of (a) voltage versus specific capacity and (b) specific capacity versus cycle life of a battery formed with the sample material described in example 4.

The processing in this example was performed in an oxygen free atmosphere. The LMO powder was measured by X-ray and the X-ray diffraction pattern of the powder is shown in FIG. 8. The LMO powder was used to form coin cell following the procedure outlined above. The coin cell formed was tested and the plots of voltage versus specific capacity and specific capacity versus cycle life are shown in FIGS. 9a and 9b, respectively. First three cycles were measured at a discharge rate of 0.1 C. The next three cycles were measured at a rate of 0.2 C. The subsequently cycles were measured at a rate of 0.33 C.

Example 5

Reaction of Metal Acetate with LiOH/NH$_4$OH to Form Lithium Metal Oxide

This example demonstrates a hydroxide-based co-precipitation process similar to Example 1 except that lithium is not incorporated in the metal hydroxide precipitate.

The processing in this example through the formation of the dried precipitate was performed in an oxygen free atmosphere. Stoichiometric amounts of nickel acetate (Ni(CH$_3$COO)$_2$.xH$_2$O), cobalt acetate (Co(CH$_3$COO)$_2$.xH$_2$O) and manganese acetate (Mn(CH$_3$COO)$_2$.xH$_2$O) were dissolved in distilled water to form a metal acetate solution. Separately, an aqueous solution of LiOH and NH$_4$OH was prepared. The two solutions were gradually added to a reaction vessel to form a metal hydroxide precipitation. The reaction mixture was stirred while the temperature of the reaction mixture was kept between room temperature and 80° C. The pH of the reaction mixture was about 10-12. In general, the aqueous metal sulfate solution had a concentration of 1M to 3M, the aqueous LiOH/NH$_4$OH solution had a LiOH concentration of 1M to 3M and a NH$_4$OH concentration of 0.2-2M. The metal hydroxide precipitation was filtered, washed multiple times with distilled water, and dried at 110° C. for 16 hrs to form a metal hydroxide powder.

An appropriate amount of LiOH powder was combined with the dried metal hydroxide powder and thoroughly mixed by a Jar Mill, double planetary mixer, or dry powder mixer to form a homogenous powder mixture. The homogenized powders were calcined at 400° C. for 8 hrs in air followed by an additional mixing step to further homogenize the powder formed. The homogenized powder was again calcined at 900° C. for 12 hr in air to form the lithium composite oxide powder (LMO). The product composition was Li$_{1.2}$Ni$_{0.175}$Co$_{0.01}$Mn$_{0.525}$O$_2$.

Figure 10:
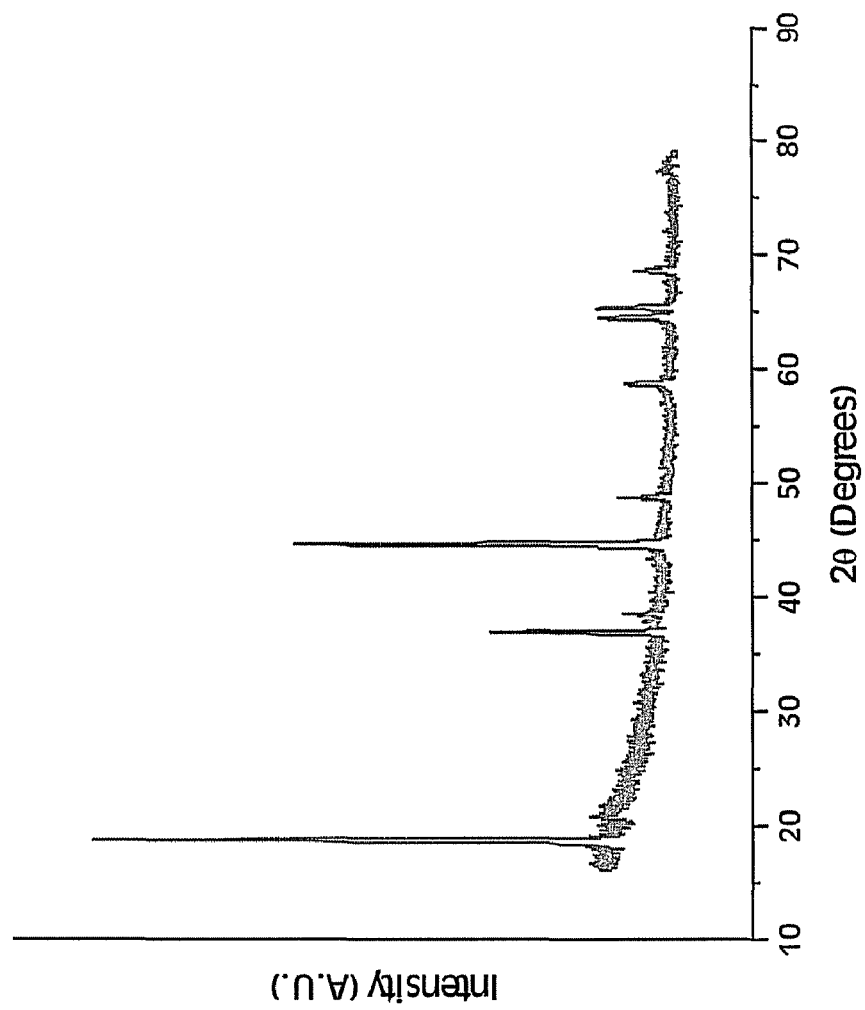
FIG. 10 is an X-ray diffraction pattern of a sample described in example 5.
Figure 11:
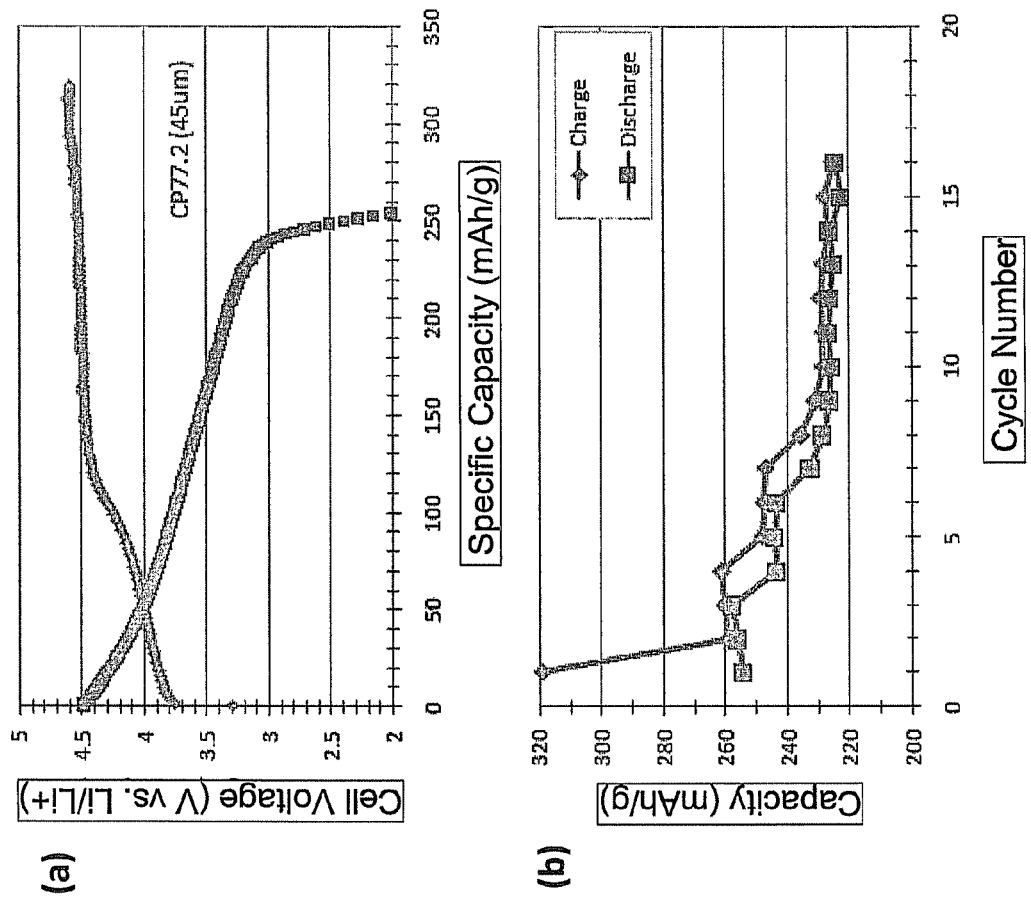
FIG. 11 shows plots of (a) voltage versus specific capacity and (b) specific capacity versus cycle life of a battery formed with the sample material described in example 5.

The LMO powder was measured by X-ray and the X-ray diffraction pattern of the powder is shown in FIG. 10. The LMO powder was used to form coin cell following the procedure outlined above. The coin cell formed was tested, and the plots of voltage versus specific capacity and specific capacity versus cycle life are shown in FIGS. 11a and 11b, respectively. The first three cycles were measured at a discharge rate of 0.1 C. The next three cycles were measured at a rate of 0.2 C. The subsequently cycles were measured at a rate of 0.33 C.

Example 6

Sol-Gel Process

This example demonstrates the synthesis of desired lithium metal oxide compositions using a sol-gel process.

Stoichiometric amounts of metal acetates were dissolved in water to form a metal acetate solution. Separately, a maleic acid solution was also prepared. The metal acetate solution was slowly added drop-wise to the maleic acid solution with constant stirring. The pH of the reaction mixture was adjusted by adding drop-wise suitable amounts of a base so that the reaction mixture was maintained with an initial clarity without any suspension throughout the reaction. After the addition of the metal acetate solution, the temperature of the reaction mixture was increased to 85° C. to slowly evaporate water from the reaction mixture to from a "sol". The "sol" was further heated at 110° C. to facilitate the formation of a "gel". The gel was then collected and pre-calcined at 480° C. for 12 h in air to remove carboxylic acid to form target composition.

The target composition was further calcined at 800–1000° C. to improve crystallinity. The crystallinity of the target composition is important for its electrochemical performance. The product composition was $Li_{1.2}Ni_{0.175}Co_{0.10}Mn_{0.525}O_2$.

Figure 12:
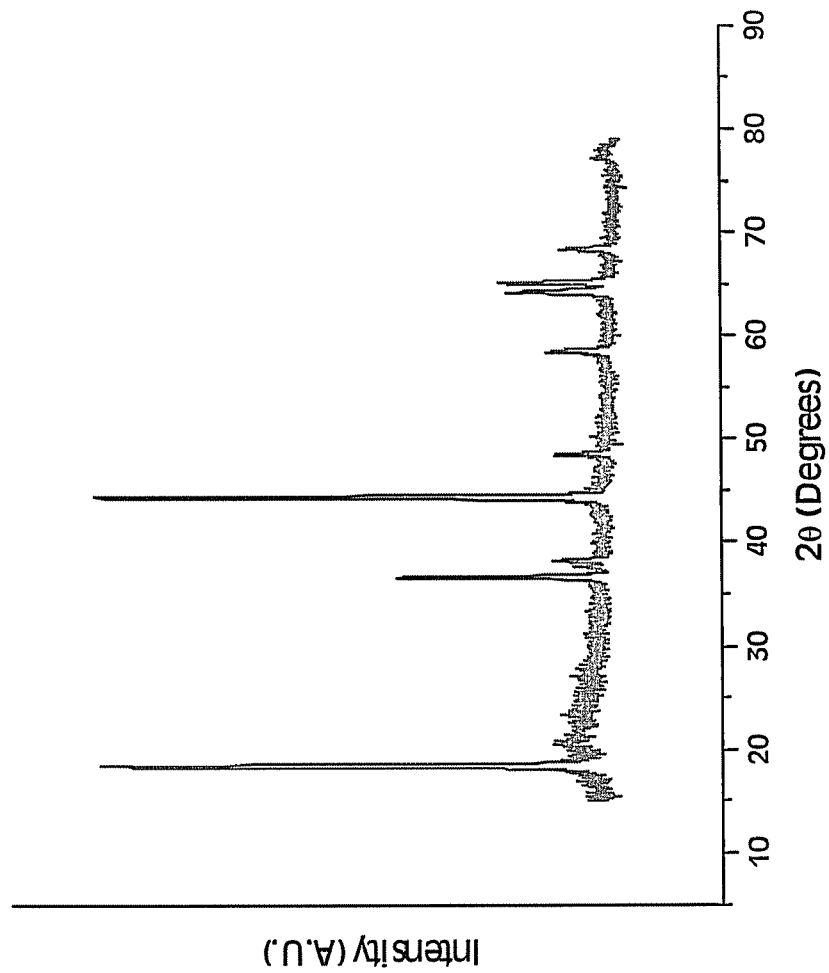
FIG. 12 is an X-ray diffraction pattern of a sample described in example 6.
Figure 13:
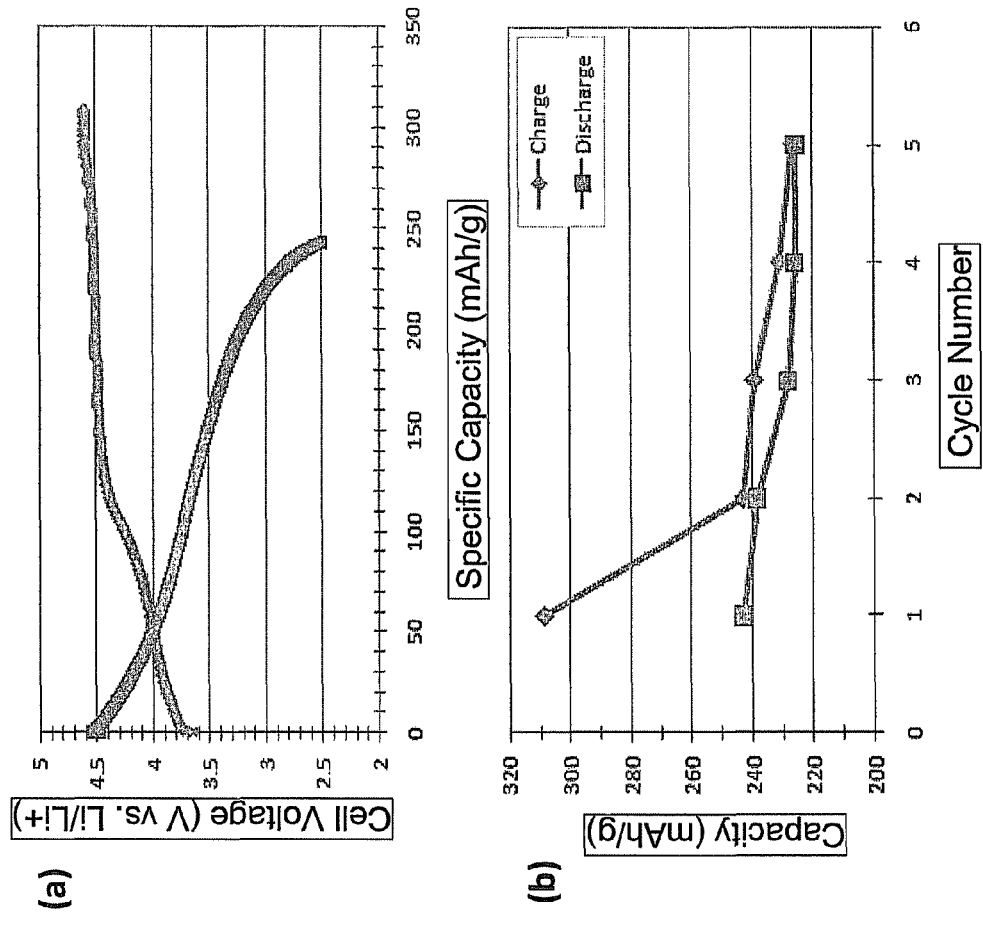
FIG. 13 shows plots of (a) voltage versus specific capacity and (b) specific capacity versus cycle life of a battery formed with the sample material described in example 6.

The product composition was measured by X-ray and the X-ray diffraction pattern of the powder is shown in FIG. 12. The composition was used to form a coin cell following the procedure outlined above. The coin cell was tested, and the plots of voltage versus specific capacity and specific capacity versus cycle life are shown in FIGS. 13a and 13b, respectively. The first three cycles were measured at a discharge rate of 0.1 C. The next three cycles were measured at a rate of 0.2 C.

Example 7

Formation of $AlF_3$ Coated Metal Oxide Materials

The metal oxide particles prepared in the above examples can be coated with a thin layer of aluminum fluoride ($AlF_3$) using a solution-assisted method. For a selected amount of aluminum fluoride coating, appropriate amount of saturated solution of aluminum nitrate was prepared in an aqueous solvent. The metal oxide particles were then added into the aluminum nitrate solution to form a mixture. The mixture was mixed vigorously for a period of time to homogenize. The length of mixing depends on the volume of the mixture. After homogenization, a stoichiometric amount of ammonium fluoride was added to the homogenized mixture to form metal hydroxide precipitate while retaining the source of fluorine. Upon the completion of the precipitation, the mixture was stirred at 80° C. for 5 h. The mixture was then filtered and the solid obtained was washed repeatedly to remove any un-reacted materials. The solid was calcined in nitrogen atmosphere at 400° C. for 5 h to form the $AlF_3$ coated metal oxide material.

Figure 14:
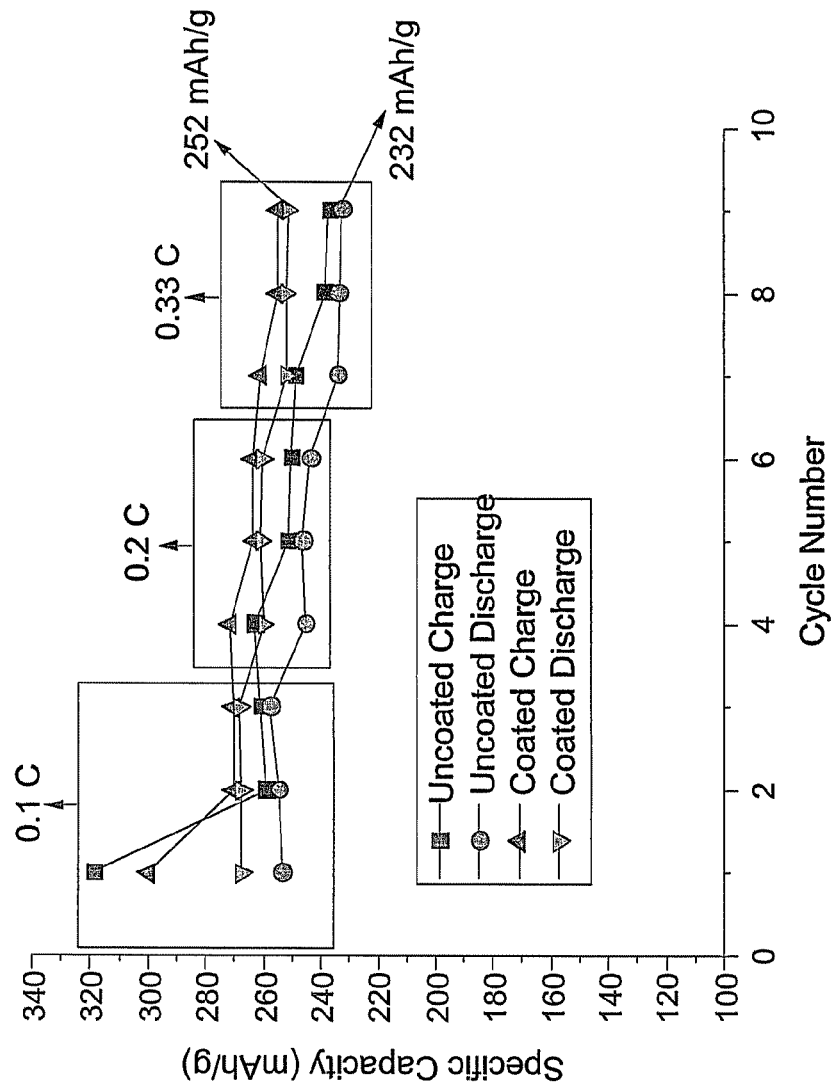
FIG. 14 is a plot of specific capacity versus cycle number for a battery formed with a positive electroactive material sample synthesized using a process in example 2 and then coated with $AlF_3$ using a process described in example 7.
Figure 15:
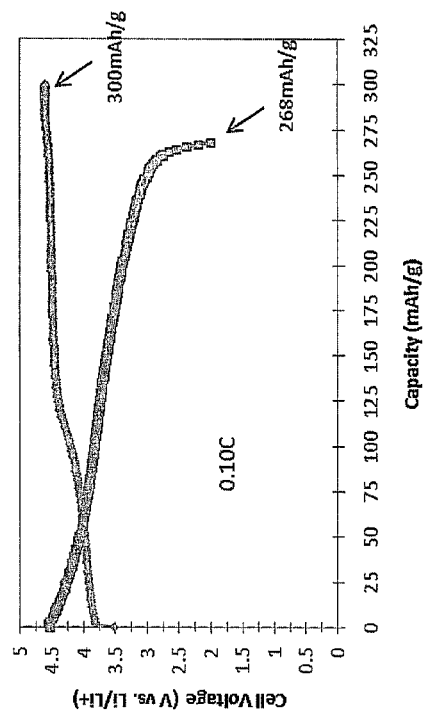
FIG. 15 is a plot of voltage versus capacity of a 3 mole % aluminum fluoride coated metal oxide at a discharge rate of 0.1 C.
Figure 16:
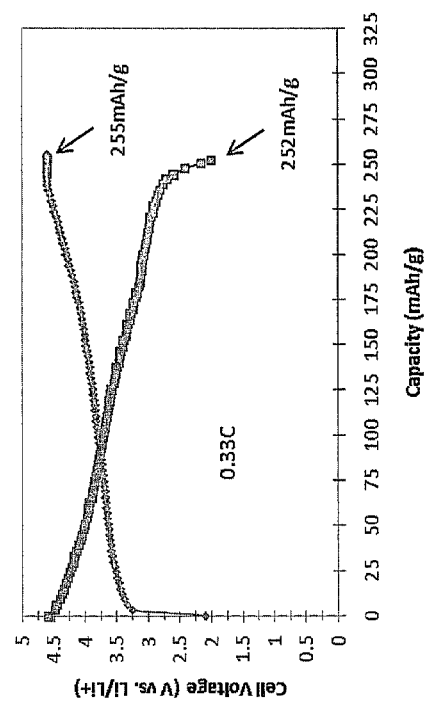
FIG. 16 is a plot of voltage versus capacity of a 3 mole % aluminum fluoride coated metal oxide at a discharge rate of 0.33 C.

Specifically, lithium metal oxide (LMO) particles synthesized in example 2 were coated with 3 mole % aluminum fluoride using the process described in this example. The aluminum fluoride coated LMOs were then used to form coin cells following the procedure outlined above. The coin cells were tested, and the plots of specific capacity versus cycle life are shown in FIG. 14. FIG. 14 has data from coin cells formed from aluminum fluoride coated LMO of example 2. FIGS. 15 and 16 are plots of voltage versus specific capacity of a 3 mole % aluminum fluoride coated metal oxide at discharge rate of 0.1 C and 0.33, respectively.

Example 8

Performance Results for Different Coating Amounts in $AlF_3$ Coated Metal Oxide Materials The example demonstrated that performance depends significantly on the amount of $AlF_3$ coating material.

Cathode material having a composition $Li[Li_{0.2}Ni_{0.175}Co_{0.10}Mn_{0.525}]O_2$ was synthesized using a co-precipitation process between metal acetates, sodium hydroxide and ammonium hydroxide as described in example 4. Subsequently, the material was coated with aluminum fluoride to form $AlF_3$ coated $Li[Li_{0.2}Ni_{0.175}Co_{0.10}Mn_{0.525}]O_2$ ($AlF_3$-LMO) composition having aluminum fluoride mole percentage of 1%, 2% and 4%. The $AlF_3$-LMO materials were then used to form coin cells following the procedure outlined above.

Figure 17:
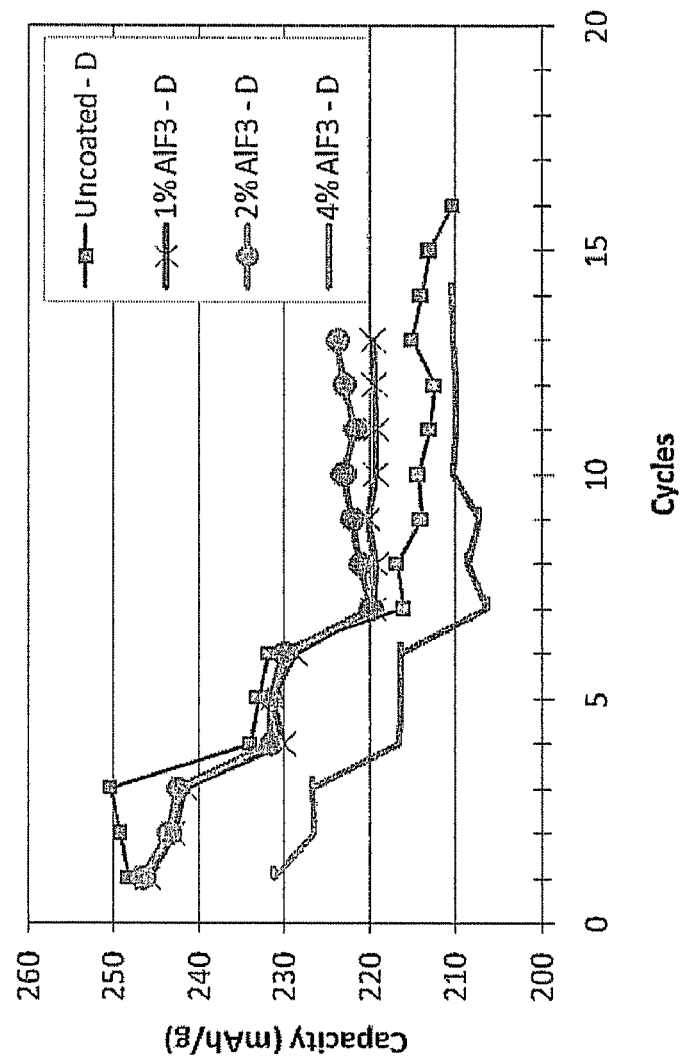
FIG. 17 is a plot of specific capacity versus cycle number for a battery formed with a positive electroactive material sample with $AlF_3$ coating showing the improved capacity of the cells at higher discharge rates of C/3.

The coin cells were tested, and the plots of specific capacity versus cycle life are shown in FIG. 17. First three cycles of the cells were tested at discharge rate of C/10. Cycles 4-6 were tested at discharge rate of C/5 and subsequently the cells were cycled at discharge rate of C/3. FIG. 17 shows that $AlF_3$ coating improves the capacity of the cells at higher discharge rates of C/3. Capacity at C/3 discharge rate is higher for samples coated with 1 mol % and 2 mol % of $AlF_3$ as compared to uncoated sample. However, the sample coated with 4 mol % of $AlF_3$ has a lower capacity compared to the uncoated sample. Aluminum fluoride itself is not electrochemically active. When the loss of specific capacity due to the amount of aluminum fluoride added to a sample exceeds where the benefit of adding aluminum fluoride coating is offset by its electrochemical inactivity, reduction in cell capacity is observed. The threshold value of the amount of aluminum fluoride used here for the $Li[Li_{0.2}Ni_{0.175}Co_{0.10}Mn_{0.525}]O_2$ material appears to be between 2 and 4 mol %.

Figure 18:
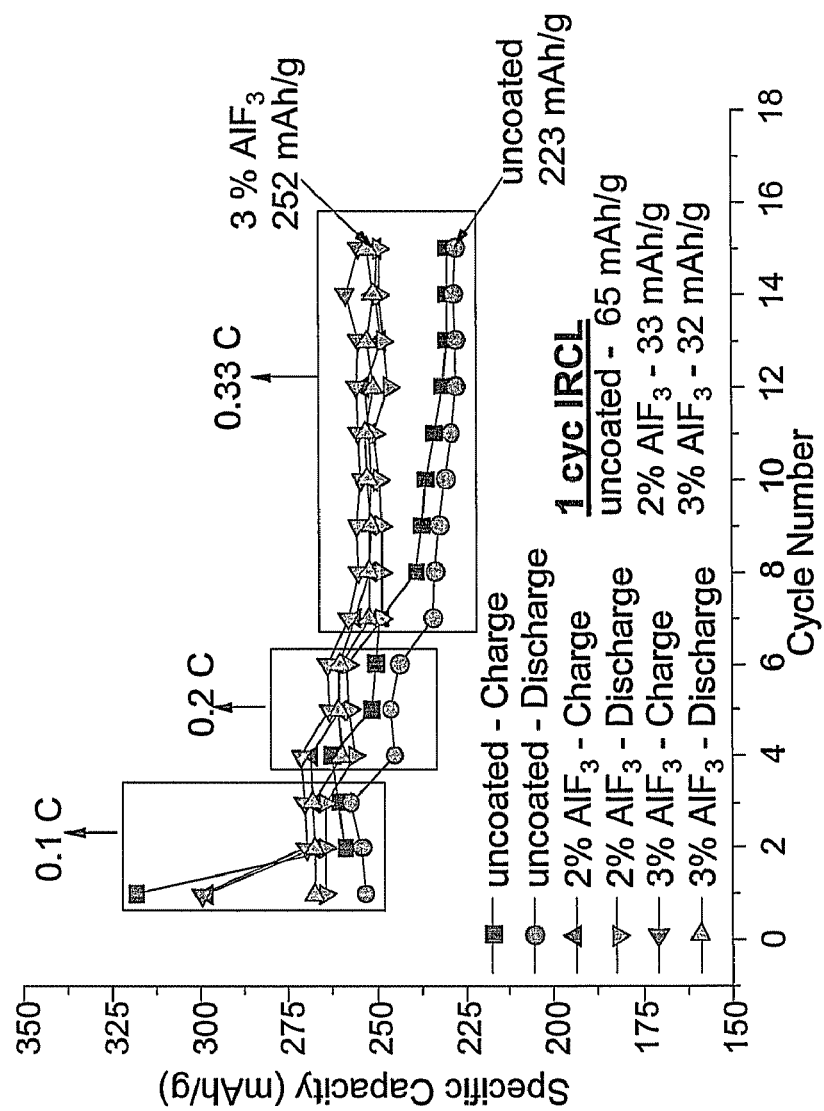
FIG. 18 is a plot of specific capacity versus cycle number for a battery formed with a positive electroactive material sample with 2 and 3 mol % $AlF_3$ coating.

An additional synthesis process was undertaken to optimize the $AlF_3$ content. Cathode material having composition $Li[Li_{0.2}Ni_{0.175}Co_{0.10}Mn_{0.525}]O_2$ was synthesized using a co-precipitation process between metal acetates and lithium hydroxide as described in example 2. Subsequently, the material was coated with aluminum fluoride to form $AlF_3$ coated $Li[Li_{0.2}Ni_{0.175}Co_{0.10}M_{0.525}]O_2$ ($AlF_3$-LMO) composition having aluminum fluoride mole percentage of 2% and 3%. The $AlF_3$-LMO materials were then used to form coin cells following the procedure outlined above. The coin cells were tested, and the plots of specific capacity versus cycle life are shown in FIG. 18. Samples coated with 2 mol % and 3 mol % aluminum fluoride showed higher capacity than the uncoated powder. $AlF_3$ coated samples also showed lower irreversible capacity loss at 32 mAh/g compared to 65 mAh/g of the uncoated powder.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A positive electrode active material for a lithium ion cell having a discharge capacity at a 10th discharge cycle of at least 250 mAh/g at room temperature at a discharge rate of C/3 when discharged from 4.6 volts to 2.0 volts after the material is activated in the first cycle through a charge to 4.6V at a rate of C/10, comprising a lithium metal oxide composition having a formula $Li_{1+x}Ni_\alpha Mn_\beta Co_\gamma M_\delta O_{2-z}F_z$, where x ranges from about 0.05 to about 0.25, α ranges from about 0.1 to about 0.4, β ranges from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof, and a stabilizing coating, wherein the positive electrode active material has a first cycle irreversible capacity loss at a discharge rate of C/10 of no more than about ⅔ of the first cycle irreversible capacity loss of the lithium metal oxide composition, which corresponds to the positive electrode active material without the stabilization coating.

2. The positive electrode active material of claim 1 wherein the composition can be further represented by a formula of x $LiMO_2 \cdot (1-x) Li_2M'O_3$, where M represents one or more metal ions having an average valance of +3 and M' represents one or more metal ions having an average valance of +4 and $0 \leq x \leq 1$.

3. The positive electrode material of claim 2 wherein M' comprises Mn and M comprises Mn, Co and Ni.

4. The positive electrode material of claim 1 wherein the composition has a formula $Li_{1+x}Ni_\alpha Mn_\beta Co_\gamma O_2$, where x ranges from about 0.05 to about 0.25, α ranges from about 0.1 to about 0.4, β ranges from about 0.4 to about 0.65, and γ ranges from about 0.05 to about 0.3.

5. The positive electrode material of claim 1 wherein the stabilizing coating comprises $AlF_3$.

6. The positive electrode active material of claim 1 having a discharge capacity at a 10th discharge cycle of at least 255 mAh/g at room temperature at a discharge rate of C/3 when discharged from 4.6 volts to 2.0 volts.

7. The positive electrode active material of claim 1 having a discharge capacity at a 10th discharge cycle between about 260 and about 275 mAh/g at room temperature at a discharge rate of C/3 when discharged from 4.6 volts to about 2.0 volts.

8. The positive electrode active material of claim 1 wherein the stabilizing coating comprises a coating of metal fluoride.

9. A secondary lithium ion battery comprising a positive electrode comprising the positive electrode active material of claim 1, a negative electrode comprising a lithium intercalation composition and a separator between the positive electrode and the negative electrode.

10. The positive electrode active material of claim 1, wherein the lithium metal oxide composition comprises a layered lithium metal oxide comprising +4 metal cations, +3 metal cations and +2 metal cations within a crystalline lattice, wherein the stabilizing coating comprises a metal/metalloid fluoride, and wherein the positive electrode active material has a discharge capacity at the 20th cycle that is at least about 98% of the 5th cycle discharge capacity when discharged at room temperature at a discharge rate of C/3.

11. The positive electrode active material of claim 1 wherein the material comprises from about 0.5 mole percent to about 4 mole percent metal fluoride as the stabilizing coating.

12. The positive electrode active material of claim 11 wherein the metal fluoride comprises $AlF_3$.

13. The positive electrode active material of claim 1 wherein the electrode material has a discharge capacity at the 20th cycle that is at least about 98.5% of the 5th cycle discharge capacity when discharged at room temperature with a rate of C/3.

14. The positive electrode active material of claim 1 wherein the stabilizing coating comprises $Al_2O_3$.

15. A method for the synthesis of a layered lithium metal oxide composition, the method comprising
precipitating a mixed metal hydroxide composition from a solution comprising +2 metal cations wherein the hydroxide composition has a selected composition;
heating the hydroxide composition to form a metal oxide composition; and
combining a lithium source composition to the metal oxide composition to form a lithium metal oxide precursor;
heating the lithium metal oxide precursor to form a crystalline lithium metal oxide, wherein the crystalline lithium metal oxide composition has a formula $Li_{1+x}Ni_\alpha Mn_\beta Co_\gamma M_\delta O_2$, where x ranges from about 0.05 to about 0.25, α ranges from about 0.1 to about 0.4, β ranges from about 0.4 to about 0.65, γ ranges from about 0.05 to about 0.3, and δ ranges from about 0 to about 0.1, and where M is Mg, Zn, Al, Ga, B, Zr, Ti, Ca, Ce, Y, Nb or combinations thereof; and
applying a stabilizing coating to form the positive electrode active material of claim 1.

16. The method of claim 15 wherein the solution comprises acetate anions, sulfate anions, nitrate anions or combinations thereof.

17. The method of claim 15 wherein the lithium metal oxide composition has a formula $Li_{1+x}Ni_\alpha Mn_\beta Co_\gamma O_2$, where x ranges from about 0.05 to about 0.25, α ranges from about 0.1 to about 0.4, β ranges from about 0.4 to about 0.65, and γ ranges from about 0.05 to about 0.3.

18. A method for the synthesis of a layered lithium metal oxide composition, the method comprising
precipitating a mixed metal hydroxide composition from a solution comprising +2 metal cations wherein the hydroxide composition has a selected composition;
adding a lithium source in powder form to the metal hydroxide composition to form a mixture;
heating the mixture to form a corresponding crystalline lithium metal oxide composition, wherein the crystalline lithium metal oxide composition has a formula $Li_{1+x}Ni_\alpha Mn_\beta Co_\gamma M_\delta O_2$, where x ranges from about 0.05 to about 0.25, α ranges from about 0.1 to about 0.4, β ranges from about 0.4 to about 0.65, γ ranges from about 0.05 to about 0.3, and δ ranges from about 0 to about 0.1, and where M is Mg, Zn, Al, Ga, B, Zr, Ti, Ca, Ce, Y, Nb or combinations thereof; and
applying a stabilizing coating to form the positive electrode active material of claim 1.

* * * * *